US008730545B2

(12) United States Patent
Endo et al.

(10) Patent No.: US 8,730,545 B2
(45) Date of Patent: May 20, 2014

(54) COLOR IMAGING ELEMENT, IMAGING DEVICE, AND STORAGE MEDIUM STORING A CONTROL PROGRAM FOR IMAGING DEVICE

(71) Applicant: FUJIFILM Corporation, Tokyo (JP)

(72) Inventors: Hiroshi Endo, Saitama (JP); Yoichi Iwasaki, Saitama (JP); Takashi Aoki, Saitama (JP); Kazuki Inoue, Saitama (JP); Kenkichi Hayashi, Saitama (JP); Seiji Tanaka, Saitama (JP); Noriko Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/034,061

(22) Filed: Sep. 23, 2013

(65) Prior Publication Data

US 2014/0022614 A1   Jan. 23, 2014

Related U.S. Application Data

(63) Continuation of application No. PCT/JP2012/056595, filed on Mar. 14, 2012.

(30) Foreign Application Priority Data

Mar. 24, 2011  (JP) ................................. 2011-066632
Jul. 26, 2011   (JP) ................................. 2011-163310
Dec. 28, 2011  (JP) ................................. 2011-289043

(51) Int. Cl.
   *H04N 1/46*   (2006.01)
(52) U.S. Cl.
   USPC ............ 358/505; 358/512; 358/514; 358/528
(58) Field of Classification Search
   USPC .................................. 358/512, 514, 528, 505
   See application file for complete search history.

(56) References Cited

U.S. PATENT DOCUMENTS 6,829,008 B1   12/2004   Kondo et al.
6,995,796 B2    2/2006   Taubman
(Continued)

FOREIGN PATENT DOCUMENTS

JP   8-23542 A   1/1996
JP   8-23543 A   1/1996
(Continued)

OTHER PUBLICATIONS

International Search Report, mailed Apr. 24, 2012, issued in PCT/JP2012/056595.
(Continued)

*Primary Examiner* — Charlotte M Baker
*Assistant Examiner* — Rury Grisham
(74) *Attorney, Agent, or Firm* — Birch, Stewart, Kolasch & Birch, LLP

(57) ABSTRACT

The precision of phase difference AF control is raised. An image pickup device includes a color filter that is provided with repeatedly disposed basic array patterns configured with a first array pattern and a second array pattern disposed symmetrically about a point, wherein the first array pattern includes a first filter placed over 2×2 pixels at the top left and a pixel at the bottom right of a 3×3 square array, a second filter placed over a right end pixel of a vertical direction center line of the square array and over a left end pixel a lower edge line, and a third filter placed over a pixel at the right end of the vertical direction upper edge line of the square array and over a center pixel of the lower edge line, and the second array pattern has the same placement of the first filter as that in the first array pattern and has a placement of the second filter and a placement of the third filter swapped over therefrom; and phase difference detection pixels that are placed at positions corresponding to 2 pixels that are adjacent in the horizontal direction out of the 2×2 pixels of at least one side of the upper side or lower side disposed first and second array patterns out of the 2 first array patterns and the 2 second array patterns configuring the basic array pattern.

7 Claims, 20 Drawing Sheets

(56) References Cited

U.S. PATENT DOCUMENTS

| | | |
|---|---|---|
| 2002/0149686 A1 | 10/2002 | Taubman |
| 2004/0109068 A1 | 6/2004 | Mitsunaga et al. |
| 2004/0169747 A1 | 9/2004 | Ono et al. |
| 2006/0203113 A1 | 9/2006 | Wada et al. |
| 2007/0153104 A1 | 7/2007 | Ellis-Monaghan et al. |
| 2008/0131028 A1 | 6/2008 | Pillman et al. |
| 2008/0151083 A1 | 6/2008 | Hains et al. |
| 2009/0135289 A1 | 5/2009 | Kusaka |
| 2010/0091161 A1 | 4/2010 | Suzuki |
| 2010/0128152 A1 | 5/2010 | Hayasaka et al. |
| 2010/0302433 A1 | 12/2010 | Egawa |
| 2011/0069189 A1 | 3/2011 | Venkataraman et al. |
| 2012/0025060 A1 | 2/2012 | Iwata |

FOREIGN PATENT DOCUMENTS

| | | |
|---|---|---|
| JP | 11-285012 A | 10/1999 |
| JP | 2000-156823 A | 6/2000 |
| JP | 2000-308080 A | 11/2000 |
| JP | 2004-221839 A | 8/2004 |
| JP | 2004-266369 A | 9/2004 |
| JP | 3592147 B2 | 11/2004 |
| JP | 2005-136766 A | 5/2005 |
| JP | 2007-155929 A | 6/2007 |
| JP | 2007-184904 A | 7/2007 |
| JP | 2007-306490 A | 11/2007 |
| JP | 2008-236620 A | 10/2008 |
| JP | 2008-312073 A | 12/2008 |
| JP | 2009-89144 A | 4/2009 |
| JP | 2009-105682 A | 5/2009 |
| JP | 2009-217252 A | 9/2009 |
| JP | 2010-66494 A | 3/2010 |
| JP | 2010-512048 A | 4/2010 |
| JP | 2010-153511 A | 7/2010 |
| JP | 2010-154493 A | 7/2010 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |

OTHER PUBLICATIONS

Office Action issued in Chinese Patent Application No. 201180022503.3 on May 23, 2013.

Written Opinion of the International Searching Authority, mailed Apr. 24, 2012, issued in PCT/JP2012/056595.

Written Opinion of the International Searching Authority, mailed Jan. 15, 2013, issued in PCT/JP2012/080899.

Written Opinion of the International Searching Authority, mailed Jan. 15, 2013, issued in PCT/JP2012/081644.

Written Opinion of the International Searching Authority, mailed Jan. 22, 2013, issued in PCT/JP2012/080898.

Written Opinion of the International Searching Authority, mailed Jan. 29, 2013, issued in PCT/JP2012/083583.

FIG.3

FIG.5A
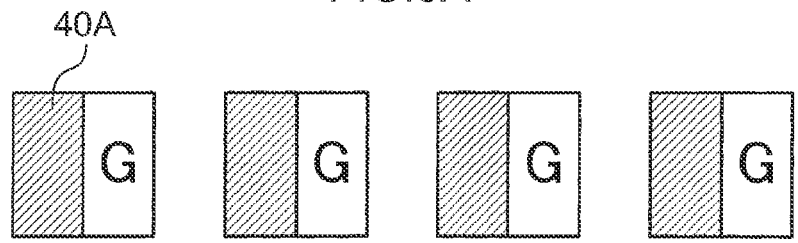
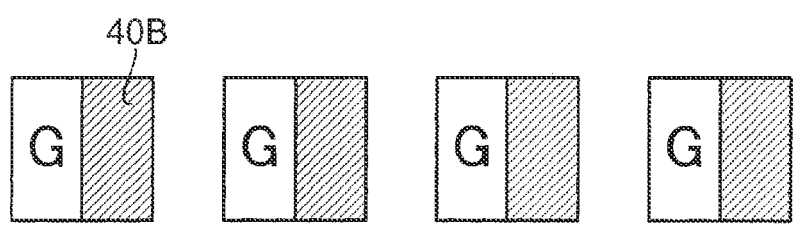
FIG.5B
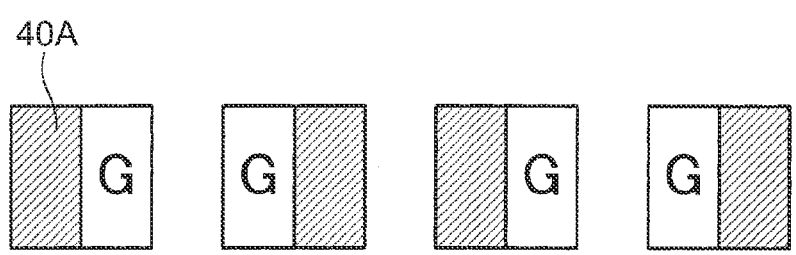
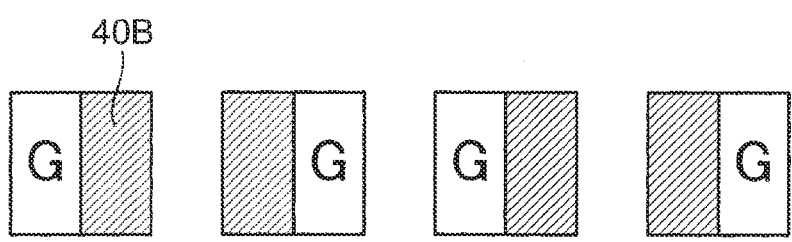

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | G | R | G | G | B | G | G | R | G | G | B | G | G | R | G | G | B | G | G | R | G | G | B | G |
| 2 | B | G | B | R | G | R | B | G | B | R | G | R | B | G | B | R | G | R | B | G | B | R | G | R |
| 3 | G | R | G | G | B | G | G | R | G | G | B | G | G | R | G | G | B | G | G | R | G | G | B | G |
| 4 | G | B | G | G | R | G | G | B | G | G | R | G | G | B | G | G | R | G | G | B | G | G | R | G |
| 5 | R | G | R | B | G | B | R | G | R | B | G | B | R | G | R | B | G | B | R | G | R | B | G | B |
| 6 | G | B | G | G | R | G | G | B | G | G | R | G | G | B | G | G | R | G | G | B | G | G | R | G |
| 7 | G | R | G | G | B | G | G | R | G | G | B | G | G | R | G | G | B | G | G | R | G | G | B | G |
| 8 | B | G | B | R | G | R | B | G | B | R | G | R | B | G | B | R | G | R | B | G | B | R | G | R |
| 9 | G | R | G | G | B | G | G | R | G | G | B | G | G | R | G | G | B | G | G | R | G | G | B | G |
| 10 | G | B | G | G | R | G | G | B | G | G | R | G | G | B | G | G | R | G | G | B | G | G | R | G |
| 11 | R | G | R | B | G | B | R | G | R | B | G | B | R | G | R | B | G | B | R | G | R | B | G | B |
| 12 | G | B | G | G | R | G | G | B | G | G | R | G | G | B | G | G | R | G | G | B | G | G | R | G |
| 13 | G | R | G | G | B | G | G | R | G | G | B | G | G | R | G | G | B | G | G | R | G | G | B | G |
| 14 | B | G | B | R | G | R | B | G | B | R | G | R | B | G | B | R | G | R | B | G | B | R | G | R |
| 15 | G | R | G | G | B | G | G | R | G | G | B | G | G | R | G | G | B | G | G | R | G | G | B | G |
| 16 | G | B | G | G | R | G | G | B | G | G | R | G | G | B | G | G | R | G | G | B | G | G | R | G |
| 17 | R | G | R | B | G | B | R | G | R | B | G | B | R | G | R | B | G | B | R | G | R | B | G | B |
| 18 | G | B | G | G | R | G | G | B | G | G | R | G | G | B | G | G | R | G | G | B | G | G | R | G |
| 19 | G | R | G | G | B | G | G | R | G | G | B | G | G | R | G | G | B | G | G | R | G | G | B | G |
| 20 | B | G | B | R | G | R | B | G | B | R | G | R | B | G | B | R | G | R | B | G | B | R | G | R |
| 21 | G | R | G | G | B | G | G | R | G | G | B | G | G | R | G | G | B | G | G | R | G | G | B | G |
| 22 | G | B | G | G | R | G | G | B | G | G | R | G | G | B | G | G | R | G | G | B | G | G | R | G |
| 23 | R | G | R | B | G | B | R | G | R | B | G | B | R | G | R | B | G | B | R | G | R | B | G | B |
| 24 | G | B | G | G | R | G | G | B | G | G | R | G | G | B | G | G | R | G | G | B | G | G | R | G |

| G5 |    |    | G6 |
|----|----|----|----|
|    | G1 | G2 |    |
|    | G4 | G3 |    |
| G8 |    |    | G7 |

FIG.17

|   | | | | | | | | | | | |
|---|---|---|---|---|---|---|---|---|---|---|---|
| 1 | G | R | G | G | B | G | G | R | G | G | B | G |
| 2 | B | G | B | R | G | R | B | G | B | R | G | R |
| 3 | G | R | G | G | B | G | G | R | G | G | B | G |
| 4 | G | B | G | G | R | G | G | B | G | G | R | G |
| 5 | R | G | R | B | G | B | R | G | R | B | G | B |
| 6 | G | B | G | G | R | G | G | B | G | G | R | G |
| 7 | G | R | G | G | B | G | G | R | G | G | B | G |
| 8 | B | G | B | R | G | R | B | G | B | R | G | R |
| 9 | G | R | G | G | B | G | G | R | G | G | B | G |
| 10 | G | B | G | G | R | G | G | B | G | G | R | G |
| 11 | R | G | R | B | G | B | R | G | R | B | G | B |
| 12 | G | B | G | G | R | G | G | B | G | G | R | G |
| 13 | G | R | G | G | B | G | G | R | G | G | B | G |
| 14 | B | G | B | R | G | R | B | G | B | R | G | R |
| 15 | G | R | G | G | B | G | G | R | G | G | B | G |
| 16 | G | B | G | G | R | G | G | B | G | G | R | G |
| 17 | R | G | R | B | G | B | R | G | R | B | G | B |
| 18 | G | B | G | G | R | G | G | B | G | G | R | G |
| 19 | G | R | G | G | B | G | G | R | G | G | B | G |
| 20 | B | G | B | R | G | R | B | G | B | R | G | R |
| 21 | G | R | G | G | B | G | G | R | G | G | B | G |
| 22 | G | B | G | G | R | G | G | B | G | G | R | G |
| 23 | R | G | R | B | G | B | R | G | R | B | G | B |
| 24 | G | B | G | G | R | G | G | B | G | G | R | G |

FIG.18

| | | | | | | 40A | 40B | | | | |
|---|---|---|---|---|---|---|---|---|---|---|---|
| 1 | G | R | G | G | B | G | G | R | G | G | B | G |
| 2 | B | G | B | R | G | R | B | G | B | R | G | R |
| 3 | G | R | G | G | B | G | G | R | G | G | B | G |
| 4 | G | B | G | G | R | G | G | B | G | G | R | G |
| 5 | R | G | R | B | G | B | R | G | R | B | G | B |
| 6 | G | B | G | G | R | G | G | B | G | G | R | G |
| 7 | G | R | G | G | B | G | G | R | G | G | B | G |
| 8 | B | G | B | R | G | R | B | G | B | R | G | R |
| 9 | G | R | G | G | B | G | G | R | G | G | B | G |
| 10 | G | B | G | G | R | G | G | B | G | G | R | G |
| 11 | R | G | R | B | G | B | R | G | R | B | G | B |
| 12 | G | B | G | G | R | G | G | B | G | G | R | G |
| 13 | G | R | G | G | B | G | G | R | G | G | B | G |
| 14 | B | G | B | R | G | R | B | G | B | R | G | R |
| 15 | G | R | G | G | B | G | G | R | G | G | B | G |
| 16 | G | B | G | G | R | G | G | B | G | G | R | G |
| 17 | R | G | R | B | G | B | R | G | R | B | G | B |
| 18 | G | B | G | G | R | G | G | B | G | G | R | G |
| 19 | G | R | G | G | B | G | G | R | G | G | B | G |
| 20 | B | G | B | R | G | R | B | G | B | R | G | R |
| 21 | G | R | G | G | B | G | G | R | G | G | B | G |
| 22 | G | B | G | G | R | G | G | B | G | G | R | G |
| 23 | R | G | R | B | G | B | R | G | R | B | G | B |
| 24 | G | B | G | G | R | G | G | B | G | G | R | G |

FIG.19

|    | 1 | 2 | 3 | 4 | 5 | 6 | 7 | 8 | 9 | 10 | 11 |
|----|---|---|---|---|---|---|---|---|---|----|----|
| 1  | G | R | G | G | B | G | G | R | G | G  | B  | G |
| 2  | B | G | B | R | G | R | B | G | B | R  | G  | R |
| 3  | G | R | G | G | B | G | G | R | G | G  | B  | G |
| 4  | G | B | G | G | R | G | G | B | G | G  | R  | G |
| 5  | R | G | R | B | G | B | R | G | R | B  | G  | B |
| 6  | G | B | G | G | R | G | G | B | G | G  | R  | G |
| 7  | G | R | G | G | B | G | G | R | G | G  | B  | G |
| 8  | B | G | B | R | G | R | B | G | B | R  | G  | R |
| 9  | G | R | G | G | B | G | G | R | G | G  | B  | G |
| 10 | G | B | G | G | R | G | G | B | G | G  | R  | G |
| 11 | R | G | R | B | G | B | R | G | R | B  | G  | B |
| 12 | G | B | G | G | R | G | G | B | G | G  | R  | G |
| 13 | G | R | G | G | B | G | G | R | G | G  | B  | G |
| 14 | B | G | B | R | G | R | B | G | B | R  | G  | R |
| 15 | G | R | G | G | B | G | G | R | G | G  | B  | G |
| 16 | G | B | G | G | R | G | G | B | G | G  | R  | G |
| 17 | R | G | R | B | G | B | R | G | R | B  | G  | B |
| 18 | G | B | G | G | R | G | G | B | G | G  | R  | G |
| 19 | G | R | G | G | B | G | G | R | G | G  | B  | G |
| 20 | B | G | B | R | G | R | B | G | B | R  | G  | R |
| 21 | G | R | G | G | B | G | G | R | G | G  | B  | G |
| 22 | G | B | G | G | R | G | G | B | G | G  | R  | G |
| 23 | R | G | R | B | G | B | R | G | R | B  | G  | B |
| 24 | G | B | G | G | R | G | G | B | G | G  | R  | G |

FIG.20

|    | 1 | 2 | 3 | 4 | 5 | 6 | 7 | 8 | 9 | 10 | 11 | 12 |
|----|---|---|---|---|---|---|---|---|---|----|----|----|
| 1  | G | R | G | G | B | G | G | R | G | G  | B  | G  |
| 2  | B | G | B | R | G | R | B | G | B | R  | G  | R  |
| 3  | G | R | G | G | B | G | G | R | G | G  | B  | G  |
| 4  | G | B | G | G | R | G | G | B | G | G  | R  | G  |
| 5  | R | G | R | B | G | B | R | G | R | B  | G  | B  |
| 6  | G | B | G | G | R | G | G | B | G | G  | R  | G  |
| 7  | G |   | G | G | B | G | G | R | G | G  | B  | G  |
| 8  | B | G | B | R | G | R | B | G | B | R  | G  | R  |
| 9  | G | R | G | G | B | G | G | R | G | G  | B  | G  |
| 10 | G | B | G | G | R | G | G | B | G | G  | R  | G  |
| 11 | R | G | R | B | G | B | R | G | R | B  | G  | B  |
| 12 | G | B | G | G | R | G | G | B | G | G  | R  | G  |
| 13 | G | R | G | G | B | G | G | R | G | G  | B  | G  |
| 14 | B | G | B | R | G | R | B | G | B | R  | G  | R  |
| 15 | G | R | G | G | B | G | G | R | G | G  | B  | G  |
| 16 | G | B | G | G | R | G | G | B | G | G  | R  | G  |
| 17 | R | G | R | B | G | B | R | G | R | B  | G  | B  |
| 18 | G | B | G | G | R | G | G | B | G | G  | R  | G  |
| 19 | G | R | G | G | B | G | G | R | G | G  | B  | G  |
| 20 | B | G | B | R | G | R | B | G | B | R  | G  | R  |
| 21 | G | R | G | G | B | G | G | R | G | G  | B  | G  |
| 22 | G | B | G | G | R | G | B | G | G | R  | G  |    |
| 23 | R | G | R | B | G | B | R | G | R | B  | G  | B  |
| 24 | G | B | G | G | R | G | B | G | G | R  | G  |    |

COLOR IMAGING ELEMENT, IMAGING DEVICE, AND STORAGE MEDIUM STORING A CONTROL PROGRAM FOR IMAGING DEVICE

CROSS-REFERENCE TO RELATED APPLICATIONS

This application is a continuation application of International Application No. PCT/JP2012/056595, filed Mar. 14, 2012, the disclosure of which is incorporated herein by reference in its entirety. Further, this application claims priority from Japanese Patent Application No. 2011-066632, filed Mar. 24, 2011, Japanese Patent Application No. 2011-163310, filed Jul. 26, 2011, and Japanese Patent Application No. 2011-289043, filed Dec. 28, 2012.

BACKGROUND

1. Technical Field

The present invention relates to a color image pickup device, an imaging apparatus and a control program for an imaging apparatus, and in particular to a color image pickup device that includes phase difference detection pixels and to an imaging apparatus and a control program an imaging apparatus of the same.

2. Related Art

For solid state image pickup devices installed in imaging apparatuses such as digital cameras, there are those that, in order to raise Auto Focus (AF) performance have phase difference detection pixels as a portion of the pixels out of many pixels formed on the solid state image pickup device light receiving surface (see for example Patent Documents 1 to 7).

The phase difference detection pixels are, for example as in the Patent Documents 1 to 7 listed below, configured by 2 nearby pixels mounted with the same color filter to form pairs, and are provided with light-blocking film openings that are respectively smaller than the light-blocking film openings provided to normal pixels. Moreover, the light-blocking film opening provided to one of the phase difference detection pixels configuring a pair is provided eccentrically in a separation direction (for example on the left side) from the other phase difference detection pixel, and the light-blocking film opening of the other phase difference detection pixel is provided eccentrically in the opposite direction (for example on the right side).

During AF operation in an imaging apparatus, the signals are read from the phase difference detection pixels of the solid state image pickup device, a focal point shift amount is derived from the detection signal of the pixel with light-blocking film opening eccentrically placed on the right side, and the detection signal of the pixel with the light-blocking film opening eccentrically placed on the left side, and the focal position of the imaging lens is adjusted.

The precision of such AF operation is higher the more there are of the phase difference detection pixels, however during main image capture of a normal subject image, the phase difference detection pixels have narrower light-blocking film openings and lower sensitivity, and hence there is the issue that they cannot be treated in the same way as normal pixels.

Accordingly, during reading out signals from all the pixels and generating a subject image, there is a need to perform gain correction on detection signals from the phase difference detection pixels to a similar level to the sensitivity of the normal pixels, or to treat the phase difference detection pixels as missing pixels and to perform interpolation computation correction using the detection signals of peripheral normal pixels.

Patent Documents

| | |
|---|---|
| Patent Document 1 | Japanese Patent Application Laid-Open (JP-A) No. 2000-156823 |
| Patent Document 2 | JP-A No. 2007-155929 |
| Patent Document 3 | JP-A No. 2009-89144 |
| Patent Document 4 | JP-A No. 2009-105682 |
| Patent Document 5 | JP-A No. 2010-66494 |
| Patent Document 6 | JP-A No. 2008-312073 |
| Patent Document 7 | Japanese Patent No. 3592147 |

In such AF operation, although the precision is raised the greater the number of phase difference detection pixels, during normal subject image main image capture, the phase difference detection pixels have narrower light-blocking film openings and lower sensitivities, and there is the issue that they cannot be treated the same as normal pixels, and hence the number of phase difference detection pixels cannot be increased excessively. Also, in cases in which the colors of normal pixels adjacent to respective phase difference detection pixels configuring a pair are different from each other, sometimes color mixing occurs and there is a deterioration in AF precision.

SUMMARY

The present invention addresses the above issues, and an object thereof is to provide a color image pickup device, an imaging apparatus, and a control program for such an imaging apparatus that enable AF precision using phase difference detection pixels to be raised.

In order to address the above issues, a color image pickup device of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern includes a first filter corresponding to a first color that contributes most to obtaining a brightness signal placed over 2×2 pixels at the top left and a pixel at the bottom right of a 3×3 square array, a second filter corresponding to a second color different from the first color placed over a pixel at a right end of a vertical direction center line of the square array and over a pixel at a left end of a vertical direction lower edge line of the square array, and a third filter corresponding to a third color different from the first color and the second color placed over a pixel at the right end of the vertical direction upper edge line of the square array and over a pixel at the center of the vertical direction lower edge line of the square array, and the second array pattern has the same placement of the first filter as that in the first array pattern and has a placement of the second filter and a placement of the third filter swapped over to those of the first array pattern; and phase difference detection pixels that are placed at positions corresponding to 2 pixels that are adjacent in the horizontal direction out of the 2×2 pixels of at least one side of the upper side or lower side disposed first array pattern and second array pattern out of the 2 first array patterns and the 2 second array patterns configuring the basic array pattern.

According to the present invention, the AF precision using phase difference detection pixels can be raised due to configuration with the phase difference detection pixels placed at positions corresponding to the 2 pixels that are adjacent in the horizontal direction out of the 2×2 pixels of at least one side of the upper side or lower side disposed first array pattern and second array pattern out of the 2 first array patterns and the 2 second array patterns configuring the basic array pattern.

Note that configuration may be made such that a light-blocking section is provided to the respective phase difference detection pixels that includes either a first light-blocking film that blocks light to a region that is a part of the pixel and lets light through to other regions, or a second light-blocking film that blocks light to part of the pixel and lets light pass through in a region that forms a pair with the light-pass region of the first light-blocking film.

Moreover, configuration may be made such that the first light-blocking film in the light-blocking section blocks light to a pixel horizontal direction left half region, and the second light-blocking film blocks light to a pixel horizontal direction right half region.

Moreover, configuration may be made such that a first phase difference detection pixel provided with the first light-blocking film and a second phase difference detection pixel provided with the second light-blocking film are placed adjacent to each other in the horizontal direction.

Moreover, configuration may be made such that the first color is green (G), the second color is one color of red (R) or blue (B), and the third color is the other color of red (R) or blue (B).

An imaging apparatus of the present invention includes the color image pickup device, a drive section that drives the color image pickup device so as to read phase difference detection pixel data from the phase difference detection pixels; and a focus adjustment section that adjusts focus based on the phase difference detection pixel data.

An imaging apparatus control program of the present invention causes processing to be executed in a computer to control an imaging apparatus equipped with a color image pickup device including: an image pickup device including plural photoelectric conversion elements arrayed in a horizontal direction and a vertical direction; a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern includes a first filter corresponding to a first color that contributes most to obtaining a brightness signal placed over 2×2 pixels at the top left and a pixel at the bottom right of a 3×3 square array, a second filter corresponding to a second color different from the first color placed over a pixel at a right end of a vertical direction center line of the square array and over a pixel at a left end of a vertical direction lower edge line of the square array, and a third filter corresponding to a third color different from the first color and the second color placed over a pixel at the right end of the vertical direction upper edge line of the square array and over a pixel at the center of the vertical direction lower edge line of the square array, and the second array pattern has the same placement of the first filter as that in the first array pattern and has a placement of the second filter and a placement of the third filter swapped over to those of the first array pattern; and phase difference detection pixels that are placed at positions corresponding to 2 pixels that are adjacent in the horizontal direction out of the 2×2 pixels of at least one side of the upper side or lower side disposed first array pattern and second array pattern out of the 2 first array patterns and the 2 second array patterns configuring the basic array pattern. The processing of the control program of the imaging apparatus includes driving the color image pickup device so as to read phase difference detection pixel data from the phase difference detection pixels, and adjusting focus based on the phase difference detection pixel data.

Advantageous Effects of Invention

According to the present invention, the advantageous effect is exhibited of enabling AF precision using phase difference detection pixels to be raised.

BRIEF DESCRIPTION OF DRAWINGS

FIG. 3 is a diagram illustrating placement of light-blocking portions according to a first exemplary embodiment.

FIG. 5A is a diagram to explain a placement pattern of light-blocking film.

FIG. 5B is a diagram to explain a placement pattern of light-blocking film.

FIG. 6 is a diagram illustrating light-blocking portion placement according to a second exemplary embodiment.

FIG. 7 is a diagram illustrating light-blocking portion placement according to a third exemplary embodiment.

FIG. 8 is a diagram illustrating light-blocking portion placement according to a fourth exemplary embodiment.

FIG. 9 is a diagram illustrating light-blocking portion placement according to a fifth exemplary embodiment.

FIG. 10 is a diagram illustrating light-blocking portion placement according to a sixth exemplary embodiment.

FIG. 11 is a diagram illustrating light-blocking portion placement according to a seventh exemplary embodiment.

FIG. 14 is a diagram to explain the principles of a basic array pattern contained in a color filter.

FIG. 15 is a diagram to explain a case in which pixel data of phase difference detection pixels is corrected by average value correction.

FIG. 17 is a diagram illustrating a modified example of light-blocking portion placement according to the ninth exemplary embodiment.

FIG. 18 is a diagram illustrating a modified example of light-blocking portion placement according to the ninth exemplary embodiment.

FIG. 19 is a diagram illustrating a modified example of light-blocking portion placement according to the ninth exemplary embodiment.

FIG. 20 is a diagram illustrating a modified example of light-blocking portion placement according to the ninth exemplary embodiment.

DESCRIPTION OF EMBODIMENTS

Explanation follows regarding exemplary embodiments of the present invention, with reference to the drawings.

First Exemplary Embodiment

Figure 1:
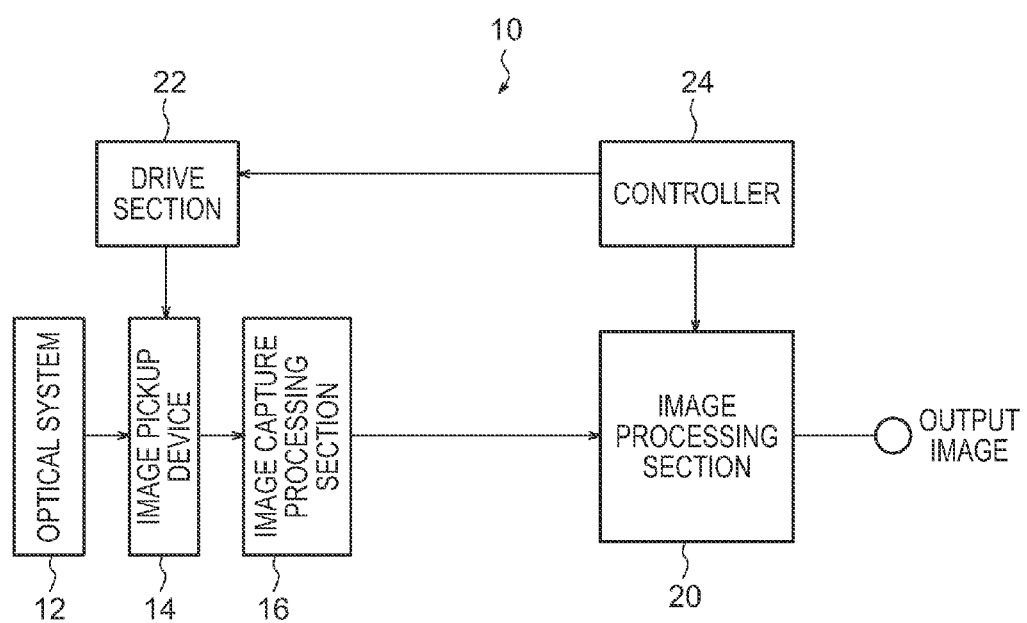
FIG. 1 is a schematic block diagram of an imaging apparatus.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and vertical direction, with a color filter disposed above the image pickup device.

Figure 2:
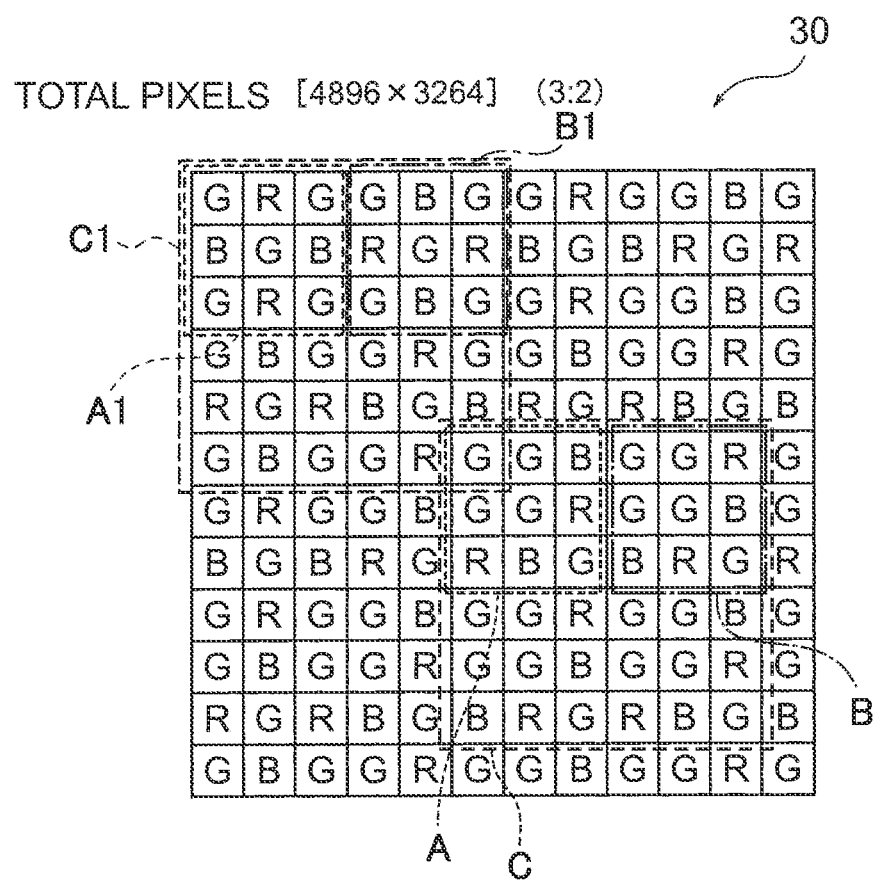
FIG. 2 is a configuration diagram of a color filter according to the present invention.

FIG. 2 illustrates a portion of a color filter 30 according to the present invention. Note that (4896×3264) pixels are provided as an example of the number of pixels with an aspect ratio of 3:2, however there is no limitation to such a number of pixels and aspect ratio. As illustrated in FIG. 2, the color filter 30 is a color filter having a repeatedly disposed 6×6 pixel basic array pattern C1 configured with a first array pattern A1 and a second array pattern B1 disposed symmetrically about a point, wherein the first array pattern A1 has a first filter G (referred to below as G filter) corresponding to G (green) that contributes most to obtaining a brightness signal placed at the 4 corner and center pixels of a 3×3 pixel square array, a second filter R (referred to below as R filter) corresponding to R (red) placed in the line at the horizontal direction center of the square array, and a third filter B (referred to below as B filter) corresponding to B (blue) placed in the line at the vertical direction center of the square array, and the second array pattern B1 has the same placement of the G filter as that of the first array pattern A1 and has the placement of the R filter and the placement of the B filter swapped over thereto.

Namely, the color filter 30 has the following features (1), (2), (3), (4) and (5).

Feature (1)

The color filter 30 illustrated in FIG. 2 includes the basic array pattern C1 formed from square placement patterns corresponding to 6×6 pixels, with the basic array pattern C1 disposed so as to repeat in both the horizontal direction and the vertical direction. Namely, the color filter array is an array in which each of the filters R, G, B (the R filter, G filter, B filter) has a specific periodicity.

Arraying the R filter, G filter and B filter thus with such a specific periodicity, enables processing to be performed in a repeating pattern such as during synchronization (interpolation) processing (also called demosaicing) of R, G, B signals read from the color image pickup device.

Moreover, when images are reduced by thinning processing in basic array pattern C units, the color filter array of the thinning processed reduced image can be made similar to the color filter array prior to thinning processing, enabling a common processing circuit to be employed.

Feature (2)

The color filter 30 illustrated in FIG. 2 has the G filter, that corresponds to the color contributing the most to obtaining a brightness signal (the color G in the present exemplary embodiment), placed in each line in the horizontal direction, vertical direction and diagonal directions of the color filter array.

The G filter corresponding to the brightness system pixels is placed in every line in the horizontal direction, vertical direction and diagonal directions of the color filter array, thereby enabling the reproduction precision of synchronization processing to be raised in the high frequency region, irrespective of the high frequency direction.

Feature (3)

In the color filter 30 illustrated in FIG. 2, the R filter and B filter, that correspond to the 2 or more other colors than the G color (the R and B colors in the present exemplary embodiment), are placed in each line in the horizontal direction and vertical direction of the color filter array.

The R filter and B filter are placed in each line in the horizontal direction and vertical direction of the color filter array, thereby enabling color moire (false color) generation to be suppressed. Thus an optical low pass filter for suppressing false color generation may be omitted from placement on the optical path of the optical system from the incident face to the imaging plane. Moreover, even in cases in which an optical low pass filter is applied, one can be employed that has a weak action to cut the high frequency components to prevent false color generation, enabling deterioration of resolution to be avoided.

The basic array pattern C1 such as illustrated in FIG. 2 can be considered as an array of alternate first array pattern A1 and second array pattern B1 in the horizontal direction and vertical direction, wherein the first array pattern A is the 3×3 pixels surrounded by the frame of the broken line, and the second array pattern B1 is the 3×3 pixels surrounded by the frame of the single dot intermittent line.

The first array pattern A1 and the second array pattern B1 both have the G filters for the respective brightness system pixels placed at their 4 corners and center, so as to be placed along their 2 diagonals. Moreover, in the first array pattern A, the B filters are arrayed in the horizontal direction on each side of the central G filter, and the R filters are arrayed in the vertical direction. However, in the second array pattern B, the R filters are arrayed on each side of the central G filter in the horizontal direction, and the B filters are arrayed in the vertical direction. Namely, the first array pattern A and the second array pattern B1 have reverse positional relationships for the R filters and the B filters, but have the same placement otherwise.

Figure 13:
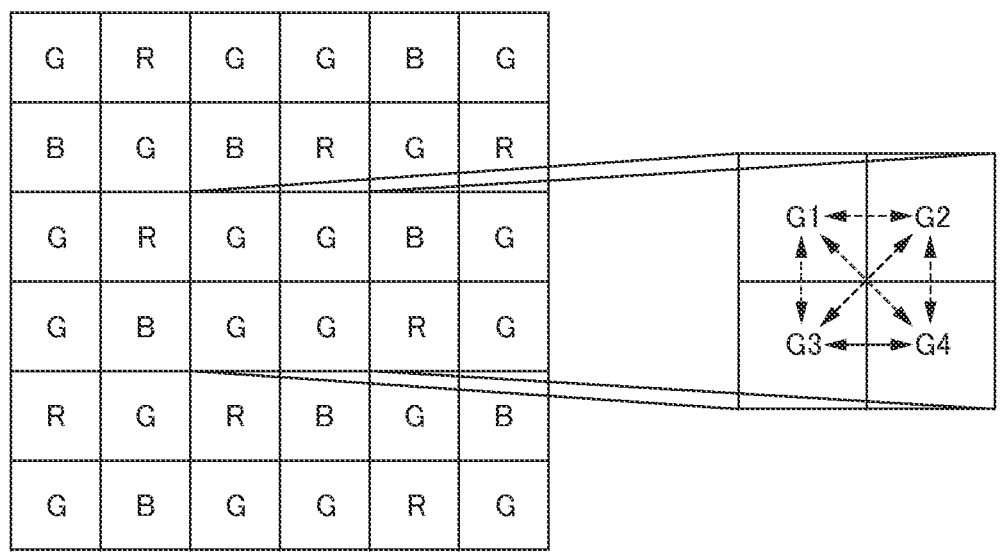
FIG. 13 is a diagram to explain a method for determining a correlation direction from pixel values of 2×2 pixels of G pixels contained in a color filter.

Moreover, the G filters at the 4 corners of the first array pattern A1 and the second array pattern B configure G filters of a square array corresponding to 2×2 pixels by disposing the first array pattern A1 and the second array pattern B1 alternately along the horizontal and vertical directions, as illustrated in FIG. 13.

Feature (4)

The color filter 30 illustrated in FIG. 2 contains a square array corresponding to 2×2 pixels formed from the G filters.

As illustrated in FIG. 13, by extracting the 2×2 pixels formed from the G filters, and deriving the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left), determination can be made that there is correlation in the direction with the smallest difference in absolute value out of the horizontal direction, vertical direction and diagonal directions.

Namely, according to the color filter array, the data of the G pixels with the smallest inter pixel separations are employed, thereby enabling determination of the direction with the highest correlation out of the horizontal direction, vertical direction and diagonal directions. The result of this directional determination can then be employed in interpolation processing from the peripheral pixels (synchronization processing).

Feature (5)

The basic array pattern C1 of the color filter 30 illustrated in FIG. 2 has point symmetry about the center of the basic array pattern C1 (the center of the 4 G filters). Moreover, as illustrated in FIG. 2, the first array pattern A1 and the second array pattern B1 inside the basic array pattern C1 also each have respective point symmetry about the G filters at their respective centers.

Such symmetry enables the circuit scale of a later stage processing circuit to be made smaller and to be simplified.

Figure 14:
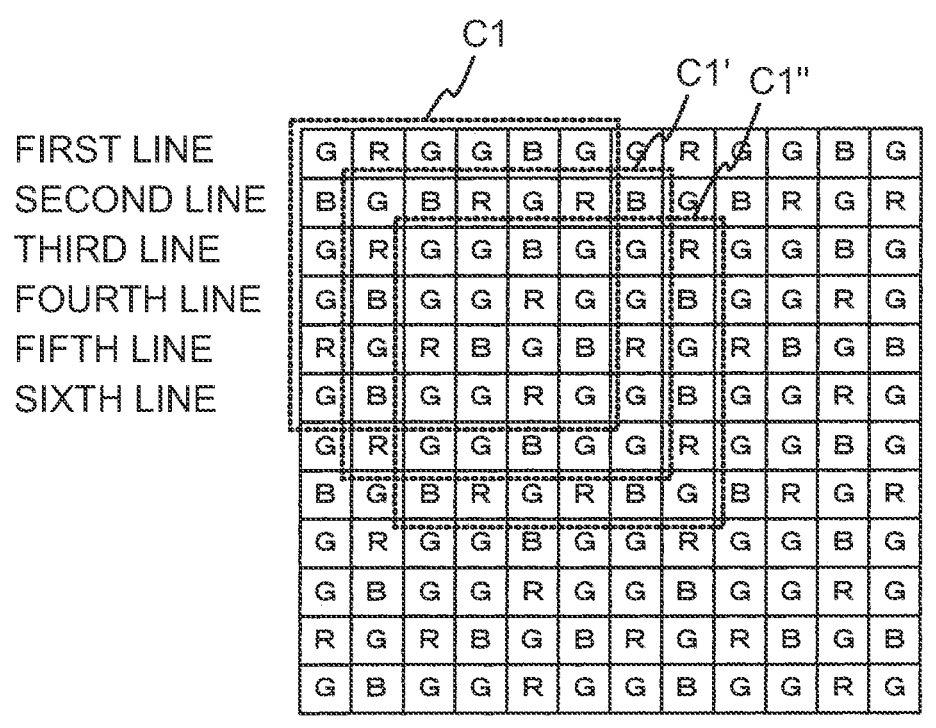

In the basic array pattern C as illustrated in FIG. 14, the color filter arrays of the first and third lines out of the first to sixth horizontal direction lines are GRGGBG, the color filter array of the second line is BGBRGR, the color filter arrays of the fourth and sixth lines are GBGGRG, and the color filter array of the fifth line is RGRBGB.

In FIG. 14, taking a shifted basic array pattern C1' as the basic array pattern C1 shifted respectively by 1 pixel each in the horizontal direction and vertical direction, and a shifted basic array pattern C1" shifted respectively by 2 pixels each, then the same color filter array results from repeatedly disposing the basic array pattern C1', C1" along the horizontal direction and vertical direction.

Namely, plural basic array patterns exist that enable configuration of the color filter array illustrated in FIG. 14 by repeatedly disposing basic array patterns in the horizontal direction and vertical direction. In the present exemplary embodiment, the basic array pattern C1 that is the basic array pattern with point symmetry is, for convenience, referred to as the basic array pattern.

Note that, as illustrated in FIG. 2, the color filter 30 can be viewed as a color filter having repeatedly disposed 6×6 pixel basic array patterns C configured with a first array pattern A and a second array pattern B disposed symmetrically about a point, wherein the first array pattern is a square array of 3×3 pixels having a G filter placed over 2×2 pixels at the top left and a lower right pixel of the 3×3 square array, a R filter placed over a pixel at the right end of a vertical direction center line of the square array and over a pixel at the left end of a vertical direction lower edge line of the square array, and a B filter placed over a pixel at the right end of the vertical direction top line of the square array and over a pixel at the center of the vertical direction lower edge line of the square array, and the second array pattern B has the same placement of the G filter as that in the first array pattern A and has a placement of the R filter and a placement of the B filter swapped over to those of the first array pattern A. In the following explanation, the color filter 30 is explained as being repeatedly disposed with the basic array pattern C.

Figure 3:
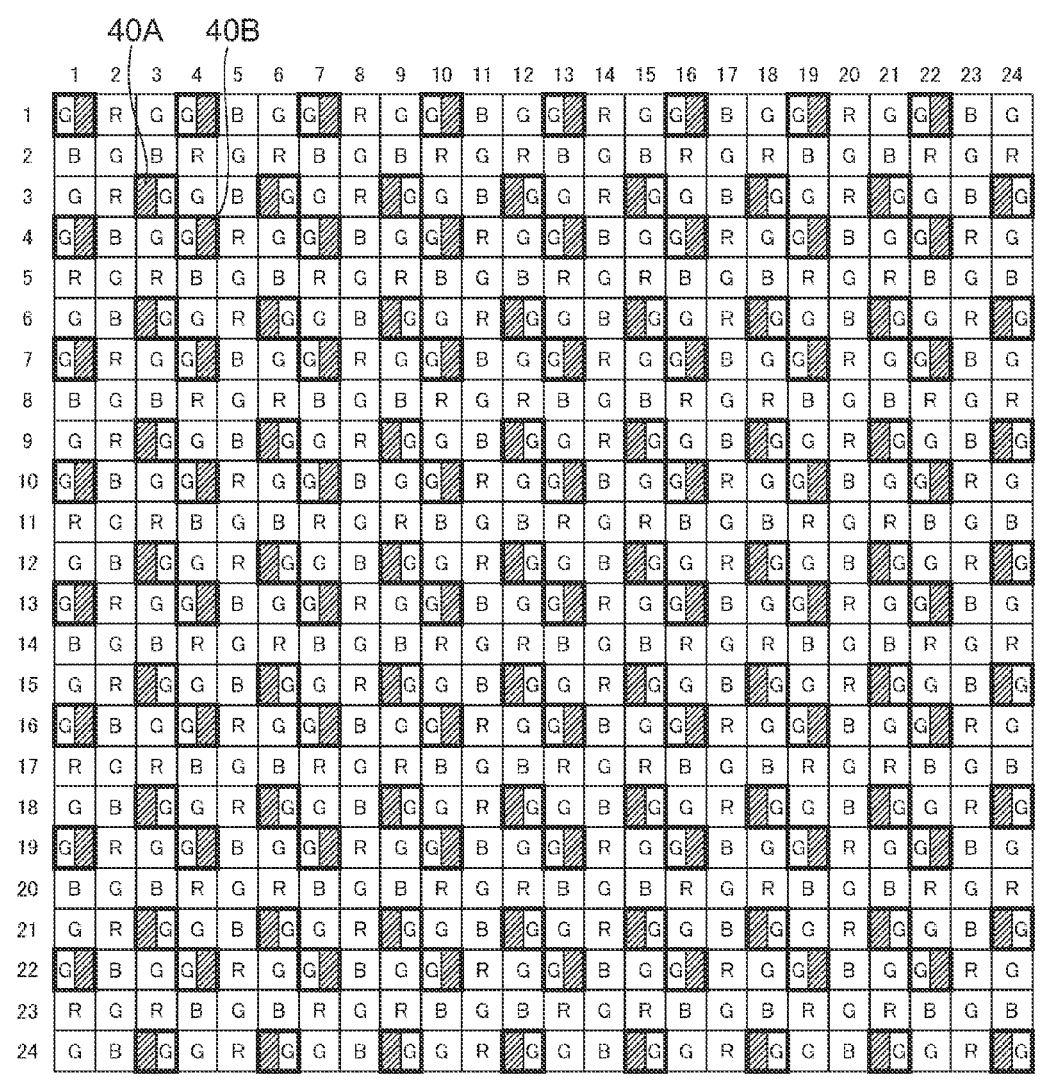

In order to perform AF control in the imaging apparatus 10 with what is referred to as a phase difference method, the image pickup device 14 has phase difference detection pixels placed in a predetermined pattern. Light-blocking portions 40 containing light-blocking films 40A that block light to the horizontal direction left half of a pixel, and light-blocking films 40B that block light to the horizontal direction right half of a pixel are formed on the phase difference detection pixels as illustrated in FIG. 3. In phase difference AF control, a phase shift amount is detected based on pixel data from the phase difference detection pixels provided with the light-blocking films 40A and based on pixel data from the phase difference detection pixels provided with the light-blocking films 40B. The focal position of the imaging lens is then adjusted based thereon.

In the present exemplary embodiment, as illustrated in FIG. 3, the light-blocking portions 40 are placed on 2 phase difference detection pixels provided on one diagonal of the 2×2 pixels at the top left of all the first array patterns A and the second array patterns B configuring the basic array pattern C, and are placed in all of the basic array patterns C. Note that in FIG. 3, the light-blocking portions 40 are provided in all of the basic array patterns C, however there is no limitation thereto, and they may be provided in only the basic array patterns C within a specific region of a section of the image pickup device. This also applies to other exemplary embodiments below.

The color filter 30 according to the present exemplary embodiment is thereby provided with the light-blocking films 40A, 40B configuring the light-blocking portions 40 adjacent to each other in a left diagonal direction of FIG. 3 and provided in all of the phase difference detection pixels, enabling the precision of phase difference AF control to be raised.

Moreover, in horizontal direction adjacent pixels, sometimes color mixing arises due to light leaking in from adjacent pixels. However in contrast thereto, in the present exemplary embodiment, as illustrated in FIG. 3, the horizontal direction adjacent pixels on the light-blocking film 40A side of the phase difference detection pixels provided with the light-blocking films 40A, and the horizontal direction adjacent pixels on the light-blocking film 40B side of the phase difference detection pixels provided with the light-blocking films 40B configuring respective pairs with the light-blocking films 40A, are either both R pixels or B pixels. Influence from color mixing can accordingly be cancelled out, enabling image quality to be improved in comparison to cases in which the horizontal direction adjacent pixels on the light-blocking film 40A side of the phase difference detection pixels provided with the light-blocking films 40A, and the horizontal direction adjacent pixels on the light-blocking film 40B side of the phase difference detection pixels provided with the light-blocking films 40B configuring respective pairs with the light-blocking films 40A, are not the same as each other.

The image capture processing section 16 subjects the image capture signals that have been output from the image pickup device 14 to predetermined processing, such as amplification processing and correlated double sampling, and A/D conversion processing, then outputs these as pixel data to the image processing section 20.

The image processing section 20 subjects the pixel data that has been output from the image capture processing section 16 to what is referred to as synchronization processing. Namely, for all the pixels, interpolation is performed of pixel data for colors other than the corresponding respective color from pixel data of peripheral pixels, so as to generate R, G, B pixel data for all pixels. Then, what is referred to as YC conversion processing is performed to the generated R, G, B pixel data, to generate brightness data Y and color difference data Cr, Cb. Then resizing processing is performed to re-size these signals to a size according to the image capture mode.

The drive section 22 performs for example driving to read image capture signals from the image pickup device 14 according to instruction from the controller 24.

The controller 24 performs overall control of the drive section 22 and the image processing section 20 according to the image capture mode. Although discussed in detail later, put briefly, the controller 24 instructs the drive section 22 to read image capture signals with a reading method corresponding to the image capture mode, and instructs the image processing section 20 to perform image processing corresponding to the image capture mode.

Since, depending on the image capture mode, there is a need to read thinned image capture signals from the image pickup device 14, the controller 24 instructs the drive section 22 so as to thin and read image capture signals using a thinning method corresponding to the instructed image capture mode.

Included as image capture modes are a still image mode that captures still images, and video modes such as an HD video mode that thins the captured image and generates High Definition (HD) video data at a comparatively high definition and records this on a recording medium such as a memory card, not illustrated in the drawings, and a through video mode (live view mode) in which a captured image is thinned and a through video of comparatively low definition is output to a display section, not illustrated in the drawings.

Figure 4:
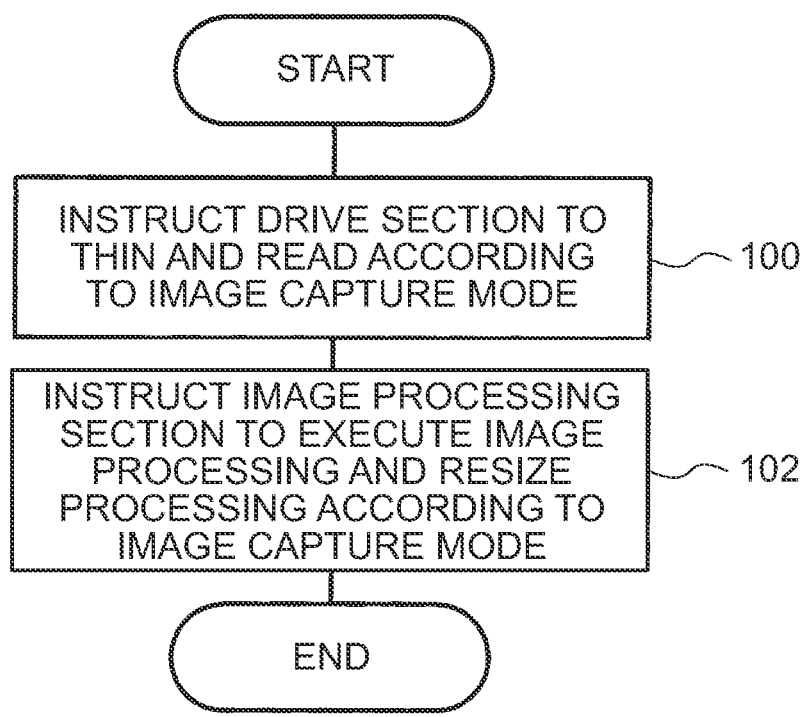
FIG. 4 is a flow chart of processing executed in a controller.

Explanation next follows of operation of the present exemplary embodiment regarding processing executed by the controller 24, with reference to the flow chart of FIG. 4.

Note that the processing illustrated in FIG. 4 is executed when execution of imaging corresponding to the image capture mode is instructed.

First, at step 100, the drive section 22 is instructed to read pixel data by a thinning method corresponding to the image capture mode.

For example, for a video mode such as a HD video mode or through video mode, since video data is generated while performing phase difference AF control, phase difference detection pixels are read from at least some of the phase difference detection pixels that are provided with the light-blocking films 40A and the light-blocking films 40B, namely from at least some of the lines containing the light-blocking films 40A and the light-blocking films 40B out of the $(6n+1)^{th}$, $(6n+3)^{th}$, $(6n+4)^{th}$, and $(6n+6)^{th}$ vertical direction lines in FIG. 3 (wherein n=0, 1, 2, and so on). Phase difference AF control is performed based on the pixel data of these lines, and the other lines $(6n+2)^{th}$ and $(6n+5)^{th}$, namely at least some of the lines out of the normal pixel lines, are read and video data generated. During generation of this video data, interpolation is performed for the phase difference detection pixels from the pixel data of the normal pixels in their periphery.

As illustrated in FIG. 3, in the present exemplary embodiment the light-blocking films 40A, 40B configuring the light-blocking portions 40 are adjacent to each other in the left diagonal direction of FIG. 3 and are provided in all of the phase difference detection pixels, enabling the precision of phase difference AF control to be raised.

The horizontal direction adjacent pixels on the light-blocking film 40A side of the phase difference detection pixels provided with the light-blocking films 40A, and the horizontal direction adjacent pixels on the light-blocking film 40B side of the phase difference detection pixels provided with the light-blocking films 40B configuring respective pairs with the light-blocking films 40A, are both either R pixels or B pixels. The influence of color mixing can accordingly be cancelled out, enabling the image quality of captured images to be raised.

At step 102, the image processing section 20 is instructed to execute image processing (synchronization processing and YC conversion processing) and resizing processing corresponding to the imaging mode.

Note that the controller 24 may be configured with a computer that includes for example a CPU, ROM, RAM and non-volatile ROM. In such cases a processing program for the above processing may, for example, be pre-stored on the non-volatile ROM, and then executed by reading into the CPU.

Note that in the present exemplary embodiment, as illustrated in FIG. 3 and FIG. 5A, explanation is given of a case in which horizontal direction array lines placed with the light-blocking films 40A are alternately disposed in the vertical direction with horizontal direction array lines placed with the light-blocking films 40B. However, as illustrated in FIG. 5B, configuration may be made with array lines of the light-blocking films 40A and the light-blocking films 40B alternately placed in this sequence along the horizontal direction, alternately disposed in the vertical direction with array lines of the light-blocking films 40B and the light-blocking films 40A alternately placed in this sequence along the horizontal direction. Note that only the phase difference detection pixels are illustrated in FIG. 5A and FIG. 5B. In the placement illustrated in FIG. 5B, since this results in diagonal placement of both the light-blocking films 40A and the light-blocking films 40B, it is possible to focus with good precision when for example capturing an image of a subject that contains diagonal lines. This also applies in the following exemplary embodiments.

Second Exemplary Embodiment

Explanation next follows regarding a second exemplary embodiment of the present invention. Note that the same reference numerals are allocated to portions similar to those of the first exemplary embodiment, and detailed explanation thereof is omitted.

Figure 6:
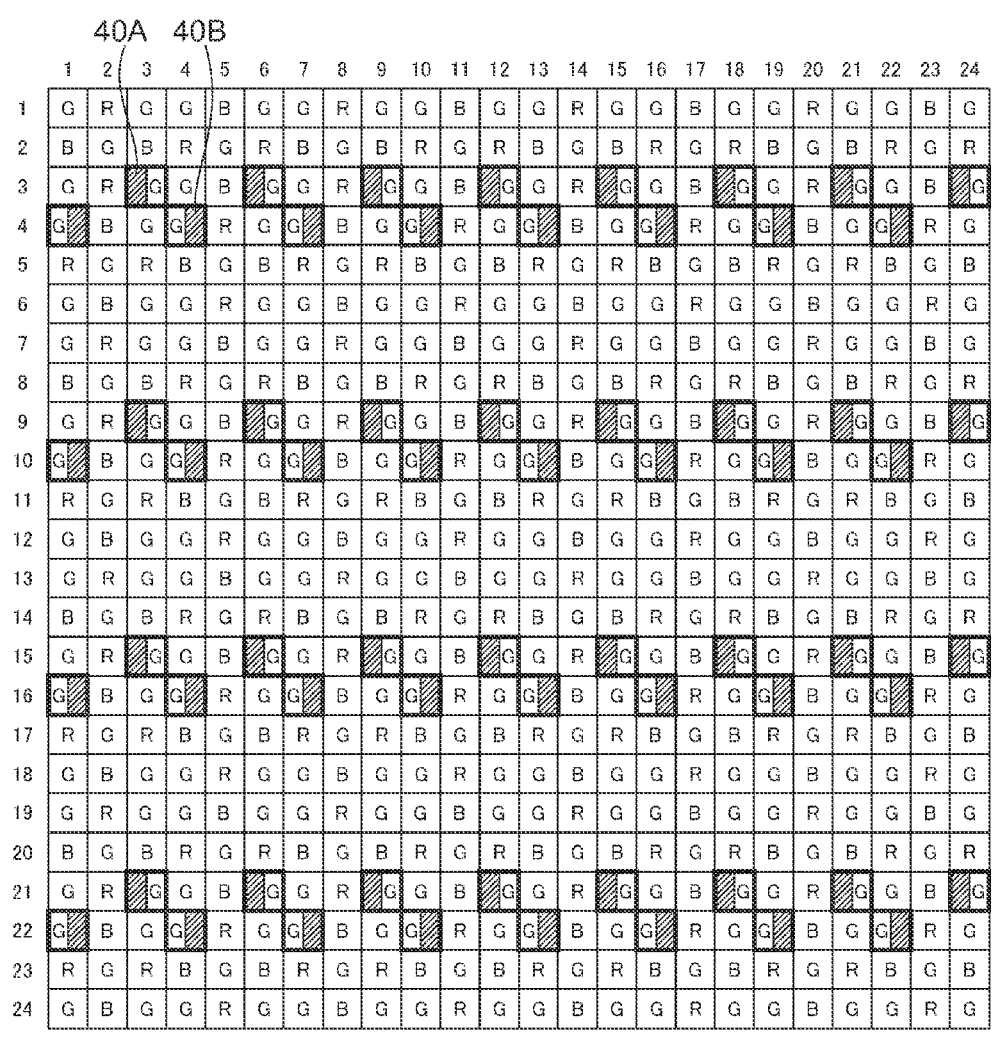

FIG. 6 illustrates a placement of light-blocking films 40A, 40B according to the present exemplary embodiment. A point of difference of the present exemplary embodiment to the first exemplary embodiment is the placement of the light-blocking films 40A, 40B.

As illustrated in FIG. 6, in the present exemplary embodiment, the light-blocking portions 40 are provided on each of the phase difference detection pixels of the upper side first array pattern A and second array pattern B out of the 2 first array patterns A and the 2 second array patterns B configuring the basic array pattern C, and are placed in all the basic array patterns C. Namely, in the example illustrated in FIG. 6, the light-blocking films 40A are placed in the $(6n+3)^{th}$ vertical direction lines, and the light-blocking films 40B are placed in the $(6n+4)^{th}$ vertical direction lines.

In such cases, when the image capture mode is a video mode, the controller 24 reads pixel data of the phase difference detection pixels in the lines placed with the light-blocking films 40A, 40B and performs phase difference AF control, and also reads pixel data of normal pixels not placed with the light-blocking films 40A, 40B, namely the pixel data in the $(6n+1)^{th}$, $(6n+2)^{th}$, $(6n+5)^{th}$, and $(6n+6)^{th}$ lines, and generates video data.

Thus in the present exemplary embodiment, the pixel data from the phase difference detection pixels is only employed for phase difference AF control, and is not used in generating video data and so there is no need for interpolation from the peripheral pixels. Moreover, the video data is generated from pixel data of normal pixels. Thus the processing speed for phase difference AF control can be raised in comparison to cases in which the phase difference detection pixels are generated based on video data. Moreover, the processing speed for video data generation can be raised in comparison to cases in which interpolated video data is generated.

Third Exemplary Embodiment

Explanation next follows regarding a third exemplary embodiment of the present invention. Note that the same reference numerals are allocated to portions similar to those of the above exemplary embodiment, and detailed description thereof is omitted.

Figure 7:
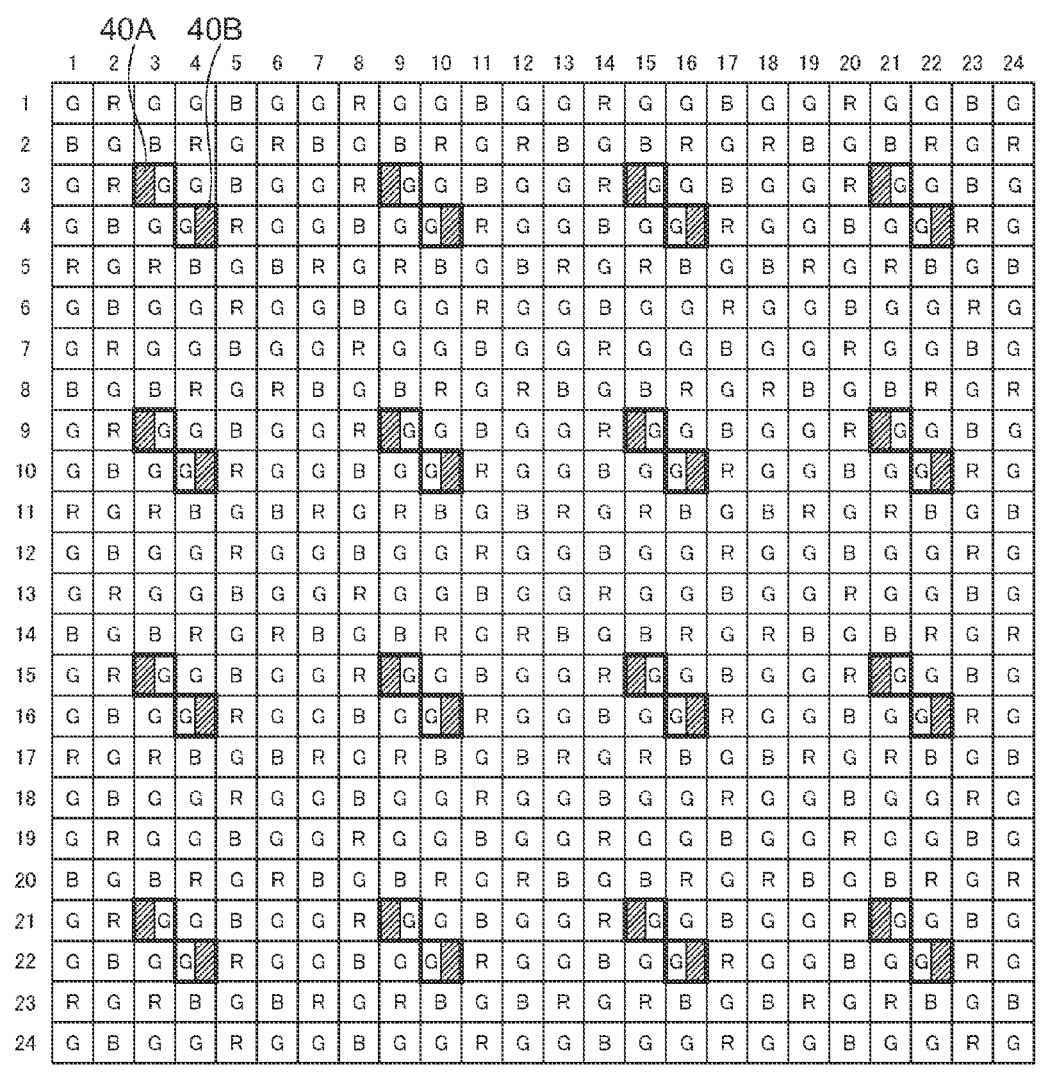

FIG. 7 illustrates a placement of light-blocking films 40A, 40B according to the present exemplary embodiment. A point of difference of the present exemplary embodiment to the first exemplary embodiment is the placement of the light-blocking films 40A, 40B. Thinning driving is similar to that of the second exemplary embodiment.

As illustrated in FIG. 7, in the present exemplary embodiment, out of the 2 first array patterns A and 2 second array patterns B configuring the respective basic array patterns C, the light-blocking portions 40 are provided on 2 phase difference detection pixels on one diagonal of the 2×2 pixels at the top left of the first array pattern A that is disposed at the top left, and are placed in all of the basic array patterns C. Namely, in the example illustrated in FIG. 7, the light-blocking films 40A, 40B are placed on the phase difference detection pixels at positions where the $(6n+3)^{th}$ and the $(6n+4)^{th}$ vertical direction lines intersect with the $(6m+3)^{th}$ and the $(6m+4)^{th}$ horizontal direction lines (m=0, 1, 2, and so on).

Therefore, since the normal pixels at the periphery of the phase difference detection pixels are increased in comparison to the second exemplary embodiment, the precision of interpolation can be raised, enabling image quality to be raised.

Moreover, the horizontal direction adjacent pixels on the light-blocking film 40A side of the phase difference detection pixels provided with the light-blocking films 40A, and the horizontal direction adjacent pixels on the light-blocking film 40B side of the phase difference detection pixels provided with the light-blocking films 40B are both the same as each other, namely R pixels. Since R wavelengths are particularly susceptible to arriving in the adjacent pixels, color mixing can be even more effectively prevented, enabling image quality to be further raised.

Fourth Exemplary Embodiment

Explanation next follows regarding a fourth exemplary embodiment of the present invention. Note that the same reference numerals are allocated to portions similar to those of the above exemplary embodiments, and detailed explanation thereof is omitted.

FIG. 8 illustrates a placement of the light-blocking films 40A, 40B according to the present exemplary embodiment. A point of difference of the present exemplary embodiment to the first exemplary embodiment is the placement of the light-blocking films 40A, 40B. Thinning driving is similar to that of the second exemplary embodiment.

As illustrated in FIG. 8, in the present exemplary embodiment, array lines configured by basic array patterns that are disposed along the horizontal direction and have the light-blocking portions 40 provided on 2 phase difference detection pixels on one diagonal of the 2×2 pixels at the top left of a first array pattern A at the top left out of 2 first array patterns A and 2 second array patterns B, are alternately disposed in the vertical direction with array lines configured by basic array patterns C that are disposed along the horizontal direction and have the light-blocking portions 40 provided on 2 phase difference detection pixels on one diagonal of the 2×2 pixels at the top left of the first array pattern B on the top right out of 2 first array patterns A and 2 second array patterns B. Namely, in the example of FIG. 8, the light-blocking films 40A, 40B are placed on the phase difference detection pixels at intersection positions of the $(6n+3)^{th}$ and the $(6n+4)^{th}$ vertical direction lines with the $(6m+1)^{th}$, $(6m+3)^{th}$, $(6m+4)^{th}$, $(6m+6)^{th}$ horizontal direction lines.

Hence, in comparison to the third exemplary embodiment, the light-blocking films 40A, 40B are also placed on the phase difference detection pixels of the $(6m+1)^{th}$ and $(6m+6)^{th}$ horizontal direction lines. Namely, due to uniform placement of the phase difference detection pixels in the horizontal direction, the precision can be raised for phase difference AF control for, for example, a high frequency image with many vertical lines.

Fifth Exemplary Embodiment

Explanation next follows regarding a fifth exemplary embodiment of the present invention. Note that the same reference numerals are allocated to portions similar to those of the above exemplary embodiments, and detailed explanation thereof is omitted.

Figure 9:
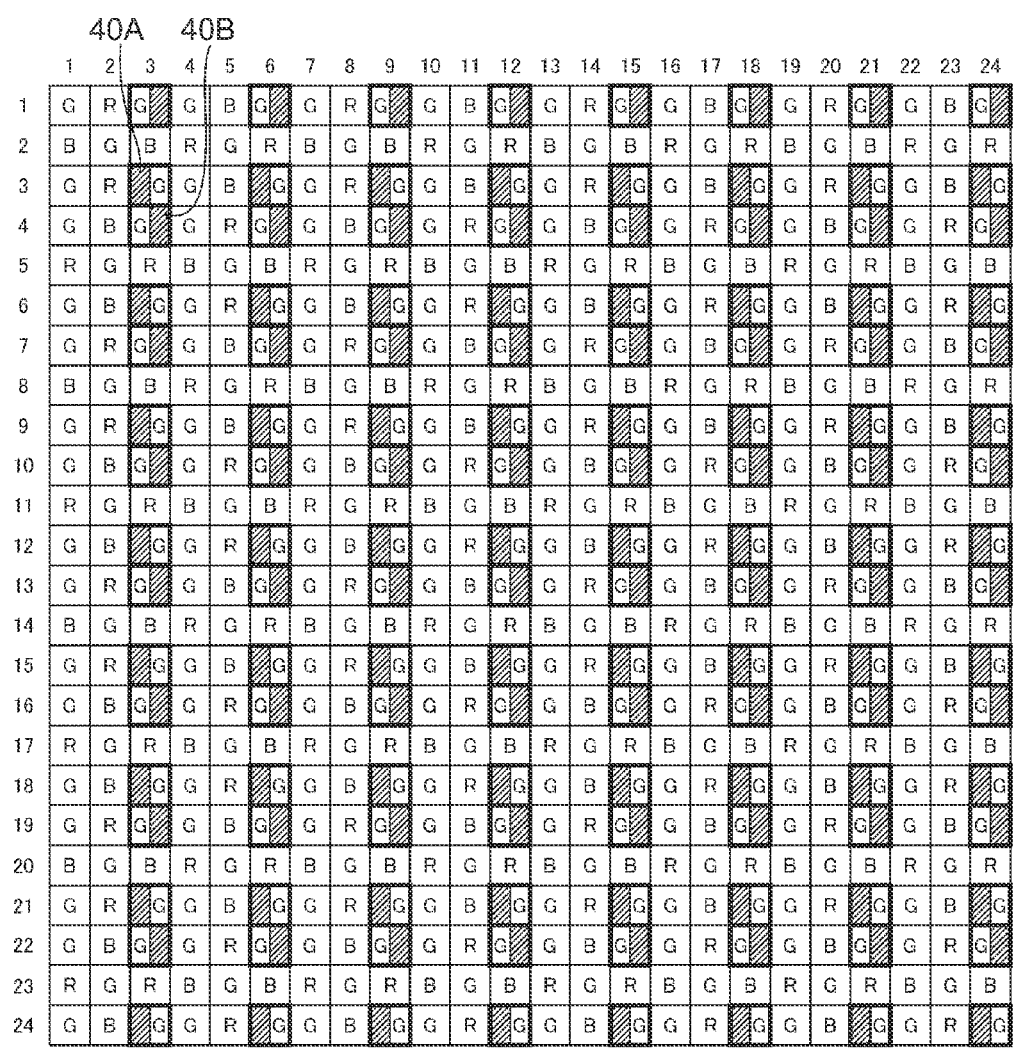

FIG. 9 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 9, in the present exemplary embodiment the light-blocking portions 40 are provided on each of 2 phase difference detection pixels on the left side of 2×2 pixels at the top left of 2 first array patterns A and 2 second array patterns B configuring each basic array pattern C, and are placed in all of the basic array patterns C.

During phase difference AF control, the precision of AF control is improved by making the phase difference detection pixels adjacent and disposing the phase difference detection pixels in the vertical direction.

Thus in the present exemplary embodiment, as illustrated in FIG. 9, the light-blocking films 40A, 40B are placed so as to fowl vertical direction adjacent pairs. An improvement in the precision of phase difference AF control can accordingly be achieved.

Sixth Exemplary Embodiment

Explanation next follows regarding a sixth exemplary embodiment of the present invention. Note that the same reference numerals are allocated to portions similar to those of the above exemplary embodiments, and detailed explanation thereof is omitted.

Figure 10:
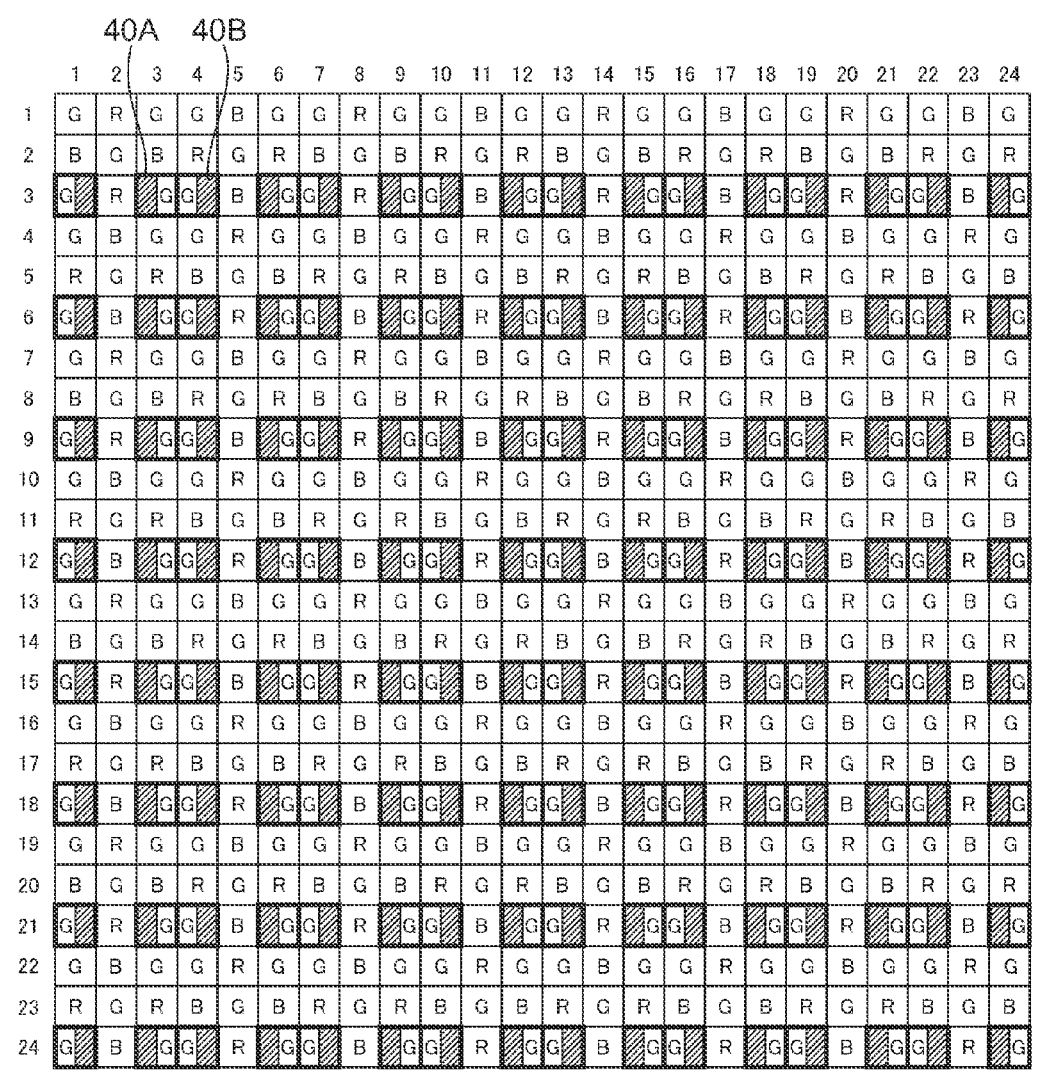

FIG. 10 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 10, in the present exemplary embodiment the light-blocking portions 40 are provided on each of 2 phase difference detection pixels on the upper side of the 2×2 pixels at the top left of 2 first array patterns A and 2 second array patterns B configuring each basic array pattern C, and are placed in all of the basic array patterns C.

Thus in the present exemplary embodiment, as illustrated in FIG. 10, the light-blocking films 40A, 40B are placed so as to form horizontal direction adjacent pairs. The number of lines in the vertical direction that include phase difference detection pixels is accordingly half that in the fifth exemplary embodiment, thereby enabling the time for reading lines including the phase difference detection pixels to be halved.

Seventh Exemplary Embodiment

Explanation next follows regarding a seventh exemplary embodiment of the present invention. Note that the same reference numerals are allocated to portions similar to those of the above exemplary embodiments, and detailed explanation thereof is omitted.

Figure 11:
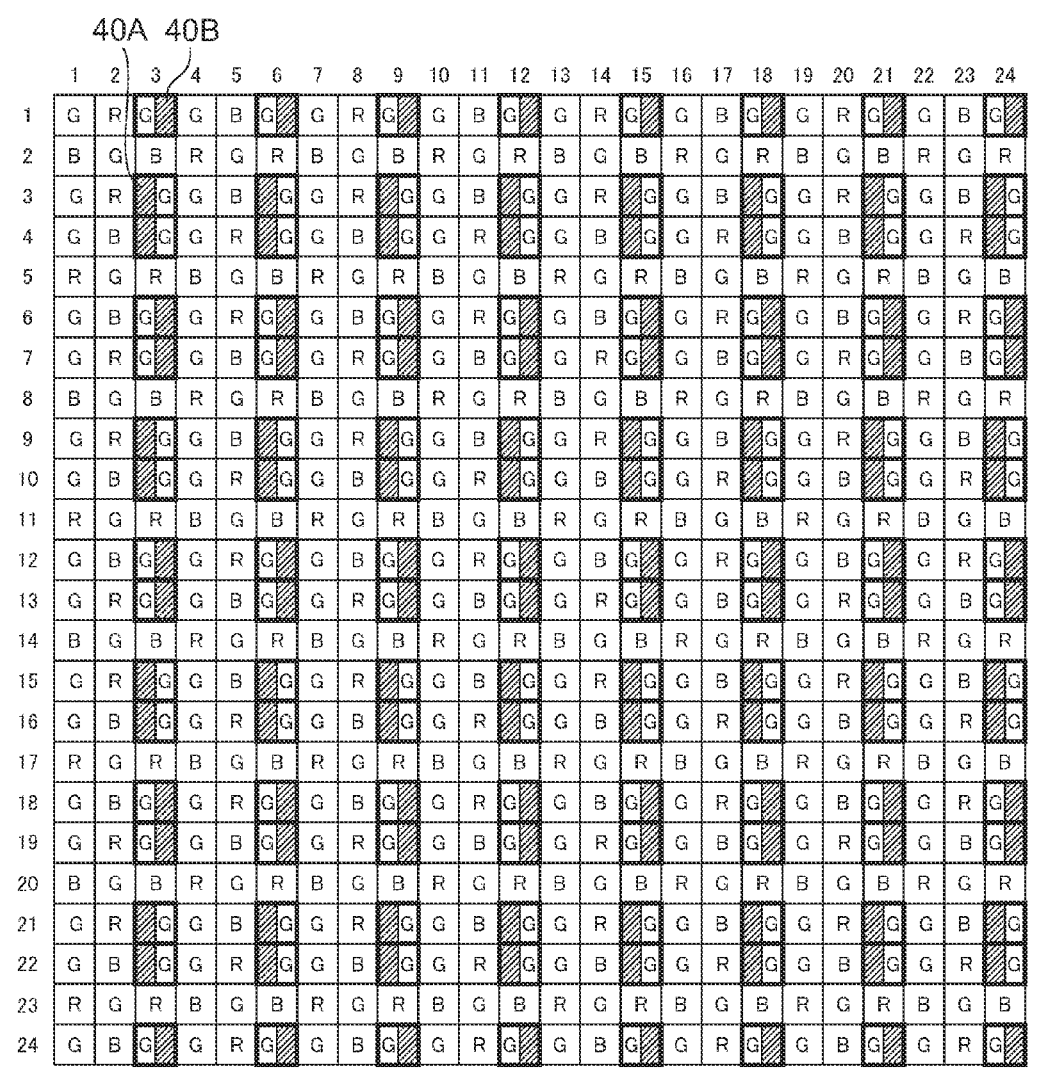

FIG. 11 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 11, in the present exemplary embodiment the light-blocking portions 40A are provided on each of 2 phase difference detection pixels on the left side of the 2×2 pixels at the top left of a first array pattern A and second array pattern B disposed at the upper side of 2 first array patterns A and 2 second array patterns B configuring each basic array pattern, and the light-blocking portions 40B are provided on each of 2 phase difference detection pixels on the left side of 2×2 pixels at the top left of the first array pattern A and second array pattern B disposed at the lower side of the 2 first array patterns A and 2 second array patterns B configuring each basic array pattern, and the light-blocking films 40A, 40B are placed in all of the basic array patterns C.

In such cases, the pixels adjacent to the light-blocking films 40A are G pixels, and the pixels adjacent to the light-blocking films 40B are R pixels or B pixels, so as to form a regular placement. The influence from color mixing can accordingly be cancelled out, enabling the precision of phase difference AF control to be raised.

Note that in each of the above exemplary embodiments explanation has been given of color filter arrays of color filters of the 3 primary colors RGB, however the type of color filters are not limited thereto.

Moreover, in each of the above exemplary embodiments, explanation has been given of configurations in which the phase difference detection pixels are provided with the light-blocking films 40A that block light to the horizontal direction left half of pixels or the light-blocking films 40B that block light to the horizontal direction right half of pixels, however there is no limitation to these light-blocking regions, as long as the light-blocking films 40A block light to a region that is a part of the phase difference detection pixels and let light through to other regions, and the light-blocking films 40B block light to part of the phase difference detection pixels and let light pass through in a region that forms a pair with the light-pass region of the light-blocking films 40A.

Figure 12:
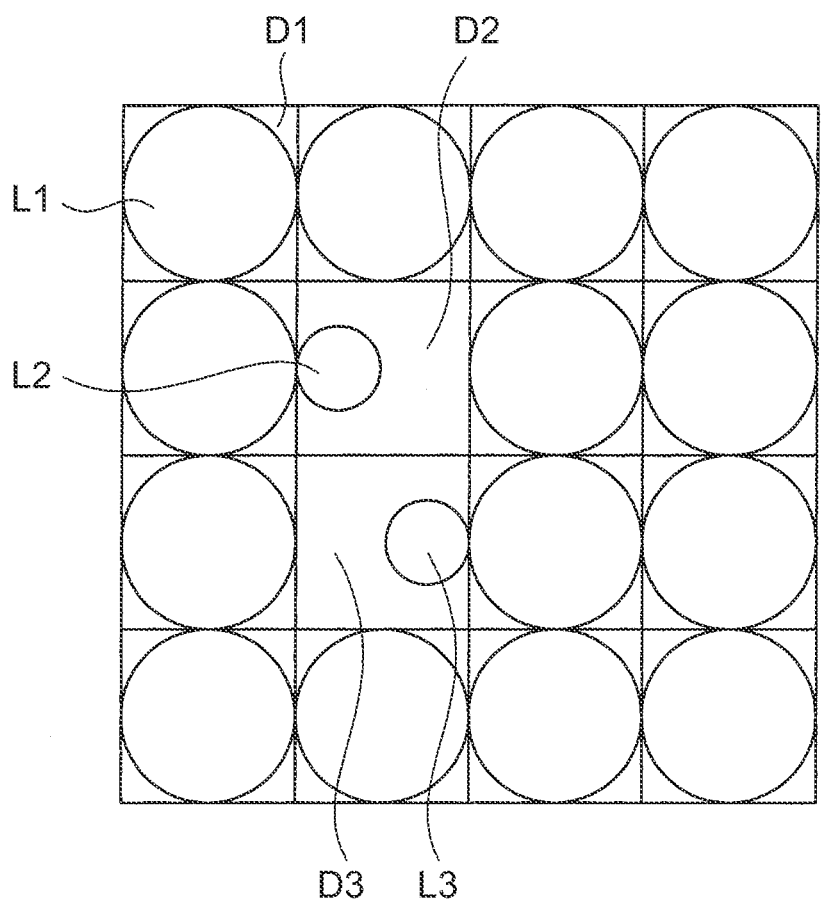
FIG. 12 is a diagram to explain a modified example of phase difference detection pixels.

Moreover, in each of the above exemplary embodiments, explanation has been given of a configuration in which the light-blocking films are provided on the phase difference detection pixels, however there is no limitation thereto. For example, the phase difference detection pixels may be formed by adopting the configuration described in Japanese Patent Application 2009-227338. Namely, a configuration in which an image pickup device is configured by top microlenses, inner microlenses, and the light receiving elements of similar shape, configured to include first pixels D1 that receive light rays that have passed through the entire region of the imaging lens eye, second pixels D2 that receive only light rays that passed through a portion of a half region of the imaging lens eye, and third pixels D3 that receive only light rays that have passed through a portion of a half region of the imaging lens eye that is a different region to in the second pixels D2. Then, as illustrated in FIG. 12, top microlenses L2, L3 are disposed on the second pixels D2 and the third pixels D3, the top microlenses L2, L3 having a smaller diameter than top microlenses L1 for the first pixels D1 and being respectively shifted in different directions with respect to the optical axes of the inner microlenses. The top microlenses and the light receiving elements are disposed shifted with respect to each other. The second pixels D2 and the third pixels D3 can accordingly be formed in this manner as the phase difference detection pixels. The present invention is also applicable to such a configuration. Moreover, depending on the configuration of the image pickup device, an embodiment may also be implemented without provision of the inner lenses. Moreover, the configuration of the phase difference pixels is not limited to the configuration described above, and it is possible to substitute any configuration capable of partitioning the eye.

Eighth Exemplary Embodiment

Explanation next follows regarding an eighth exemplary embodiment of the present invention.

Since phase difference detection pixels have a lower sensitivity than normal pixels, and their characteristics are also differ, there is a need to correct the pixel data from phase difference detection pixels when the pixel data of the phase difference detection pixels is employed as imaging data for a still image or a video image. Explanation follows regarding a pixel data correction method for phase difference detection pixels in the present exemplary embodiment.

As correction methods, two types of method are known, average value correction and gain correction, and either may be employed. Average value correction is a method in which an average value of the pixel values of normal pixels at the periphery of the phase difference detection pixels is taken as pixel data for these phase difference detection pixels. Gain correction is a method by which pixel data for the phase difference detection pixels is raised by multiplying pixel data for the phase difference detection pixels by a specific gain equivalent to the difference in level between the normal pixels and the phase difference detection pixels.

Specific explanation follows regarding a case in which pixel data of phase difference detection pixels is corrected by average value correction.

Figure 15:
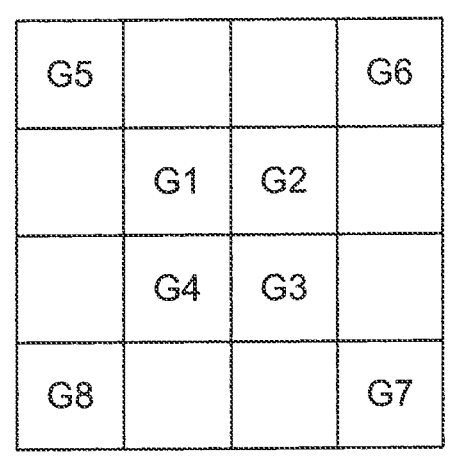

FIG. 15 illustrates G pixel placement within 4×4 pixels centered on 2×2 G pixels at the center of a basic array pattern C1. The central 2×2 G pixels in FIG. 15 are respectively G1, G2, G3, G4, clockwise from the top left, and the G pixels peripheral thereto are respectively G5, G6, G7, G8, clockwise from the top left.

In cases in which the phase difference detection pixels are placed as illustrated in FIG. 3, and FIG. 6 to FIG. 8, the G1 and G3 pixels in FIG. 15 are phase difference detection pixels.

Moreover, in cases in which the phase difference detection pixels are placed as illustrated in FIG. 9 and FIG. 11, the G1 and the G4 pixels in FIG. 15 are phase difference detection pixels.

Moreover, in cases in which the phase difference detection pixels are placed as illustrated in FIG. 10, the G1 and G2 pixels in FIG. 15 are phase difference detection pixels.

In cases in which the phase difference detection pixels are disposed as illustrated in FIG. 3 and FIG. 6 to FIG. 8, in cases in which the pixel data of the G1 pixel that is a phase difference detection pixel is employed as image data, the average value of the pixel data of peripheral normal pixels, for example each of the G2, G4, G5 pixels, is taken as the pixel data for the G1 pixel.

Moreover, in cases in which the phase difference detection pixels are placed as illustrated in FIG. 3 and FIG. 6 to FIG. 8, in cases in which the pixel data of the G3 pixel that is a phase difference detection pixel is employed as image data, the average value of the pixel data of peripheral normal pixels, for example each of the G2, G4, G7 pixels, is taken as the pixel data for the G3 pixel.

Moreover, in cases in which the phase difference detection pixels are placed as illustrated in FIG. 9 and FIG. 11, in cases in which the pixel data of the G1 pixel that is a phase difference detection pixel is employed as image data, the average value of the pixel data of peripheral normal pixels, for example each of the G2, G3, G5 pixels, is taken as the pixel data for the G2 pixel.

Moreover, in cases in which the phase difference detection pixels are placed as illustrated in FIG. 9 and FIG. 11, in cases in which the pixel data of the G4 pixel that is a phase difference detection pixel is employed as image data, the average value of the pixel data of peripheral normal pixels, for example each of the G2, G3, G8 pixels, is taken as the pixel data for the G4 pixel.

Moreover, in cases in which the phase difference detection pixels are placed as illustrated in FIG. 10, in cases in which the pixel data of the G1 pixel that is a phase difference detection pixel is employed as image data, the average value of the pixel data of peripheral normal pixels, for example each of the G3, G4, G5 pixels, is taken as the pixel data for the G1 pixel.

Moreover, in cases in which the phase difference detection pixels are placed as illustrated in FIG. 10, in cases in which the pixel data of the G2 pixel that is a phase difference detection pixel is employed as image data, the average value of the pixel data of peripheral normal pixels, for example each of the G3, G4, G6 pixels, is taken as the pixel data for the G2 pixel.

Average value correction for the pixel data of phase difference detection pixels is accordingly performed as above based on the pixel data of the peripheral normal pixels.

Note that whether a better image is obtained by performing gain correction or average value correction sometimes differs depending on the contents of the captured image. Consequently, use of gain correction or average value correction may be chosen according to the contents of the captured image.

Ninth Exemplary Embodiment

Explanation next follows regarding a ninth exemplary embodiment of the present invention. Note that the same reference numerals are allocated to portions similar to the first exemplary embodiment, and detailed explanation thereof is omitted.

Figure 16:
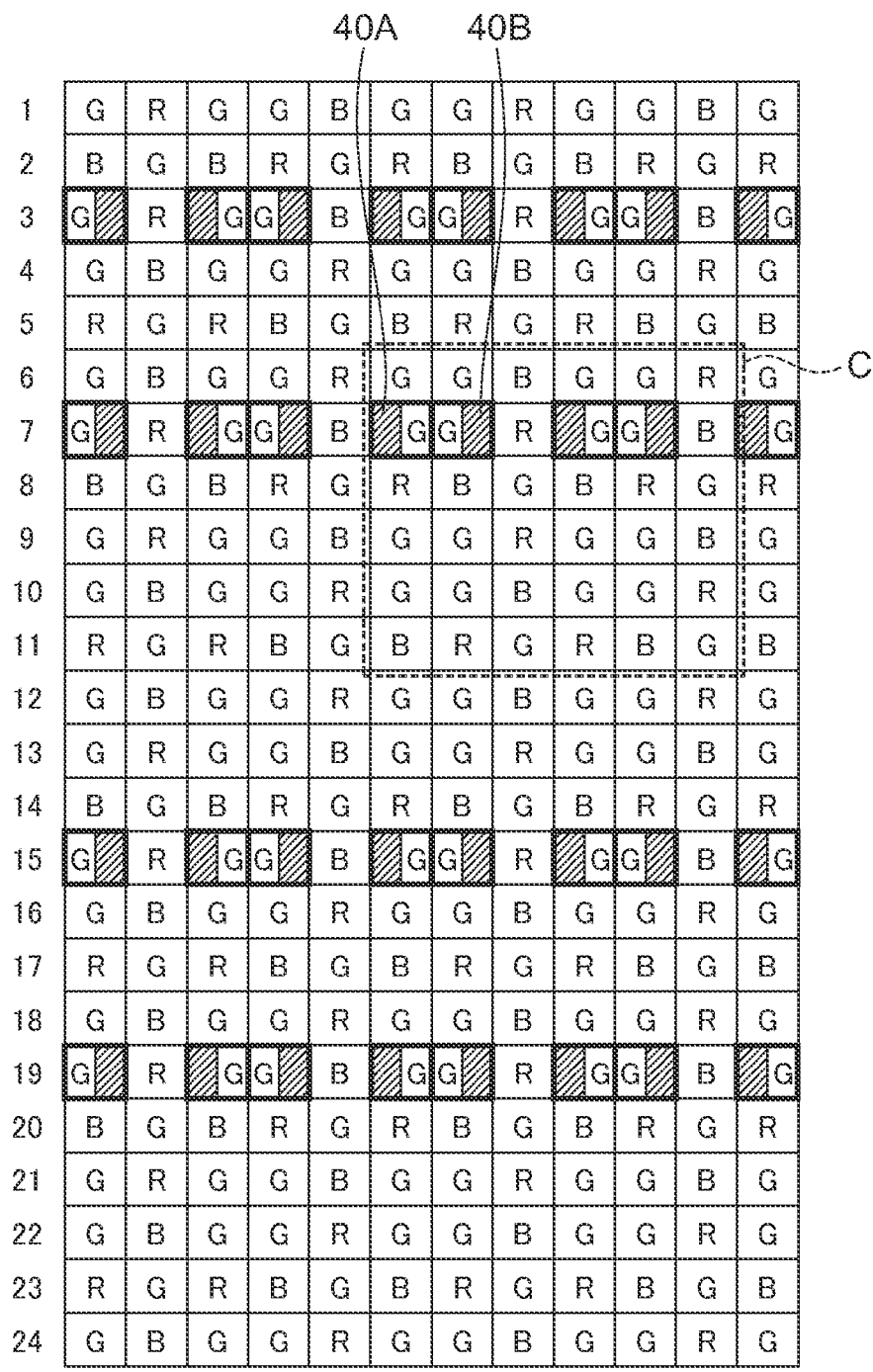
FIG. 16 is a diagram illustrating light-blocking portion placement according to a ninth exemplary embodiment.

FIG. 16 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 16, in the present exemplary embodiment, out of 2 first array patterns A and 2 second array patterns B configuring basic array patterns C, light-blocking films 40A and the light-blocking films 40B are placed in positions corresponding to 2 horizontal direction adjacent pixels out of 2×2 pixels of at least one of the upper side or the lower side of the first array patterns A (the first array pattern A on the upper side in FIG. 16) and of the second array patterns B (the second array pattern B on the upper side in FIG. 16).

Moreover, as illustrated in FIG. 16, a case has been given in which the light-blocking films 40A, 40B are placed in the first array pattern A and the second array pattern B on the upper side out of the 2 first array patterns A and 2 second array patterns B configuring the basic array pattern C, however configuration may be made such that the light-blocking films 40A and the light-blocking films 40B are placed in the first array pattern A and the second array pattern B on the lower side out of the 2 first array patterns A and 2 second array patterns B configuring the basic array pattern C.

Moreover, the light-blocking films 40A and the light-blocking films 40B are placed in 2 horizontal direction adjacent pixels at the lower side out of the 2×2 pixels in the upper side first array pattern A and second array pattern B out of the 2 first array patterns A and 2 second array patterns B configuring the basic array pattern C, namely in the $6^{th}$ to $8^{th}$ lines of the basic array pattern C disposed in the $6^{th}$ to $11^{th}$ vertical direction lines.

Moreover, the light-blocking films 40A and the light-blocking films 40B are placed in 2 horizontal direction adjacent pixels at the upper side out of the 2×2 pixels in the lower side first array pattern A and the second array pattern B out of the 2 first array patterns A and 2 second array patterns B configuring the basic array pattern C, namely in the first array pattern A and the second array pattern B in the $15^{th}$ to $17^{th}$ lines of the basic array pattern C disposed in the $12^{th}$ to $17^{th}$ vertical direction lines.

Namely, in the example in FIG. 16, the light-blocking films 40A and the light-blocking films 40B are placed on 2 horizontal direction adjacent G pixels in the $(12n+3)^{th}$ and the $(12n+7)^{th}$ vertical direction lines (n=0, 1, 2 and so on).

In such cases, in cases in which a video mode is the image capture mode, the controller 24 generates video data by excluding the lines in which the light-blocking films 40A, 40B are placed, and reading pixel data from the lines of normal pixels not placed with the light-blocking films 40A, 40B, for example the $(2n+2)^{th}$ lines. Namely, video data is generated by reading line image data from vertical direction even numbered lines.

Thus, in the present exemplary embodiment, placing both the light-blocking films 40A and the light-blocking films 40B in the vertical direction odd numbered lines enables video data to be generated by reading line image data from the vertical direction even numbered lines.

Moreover, as illustrated in FIG. 16, either the light-blocking films 40A or the light-blocking films 40B are placed on 2 horizontal direction adjacent G pixels out of 2×2 G pixels, and there are many of same colored normal pixels, these being G pixels, placed at the periphery thereof. Hence, in for example a still image mode, in cases in which pixel data from phase difference detection pixels is also employed to generate image data, the interpolation precision can be raised when interpolating pixel data for the phase difference detection pixels from the pixel data of the normal pixels.

Moreover, due to placing the light-blocking films 40A and the light-blocking films 40B in pairs adjacent to each other in the horizontal direction, the AF precision using the phase difference detection pixels can be raised.

Moreover, in cases in which the image pickup device is configured by a CMOS image sensor, there is a shift in light exposure timing for each line due to reading line image data for each of the lines sequentially in the vertical direction with what is referred to as a rolling shutter method. However, in the present exemplary embodiment, due to the paired light-blocking films 40A and the light-blocking films 40B being placed adjacent to each other in the horizontal direction, there is no timing shift between the light exposure timing of the pixels provided with the respective pairs of the light-blocking films 40A and the light-blocking films 40B. The AF precision using the phase difference detection pixels can accordingly be further raised. Note that a rolling shutter method is, in MOS image pickup devices, a method in which resetting is not performed all at once for all the pixels in 1 screen, but instead exposure is started by performing sequential resetting for each scan line and pixel (also referred to as a focal plane shutter method).

Note that although explanation has been given in the present exemplary embodiment of a configuration in which the light-blocking films 40A and the light-blocking films 40B are placed in respective pairs of horizontal direction adjacent pixels, there is no limitation thereto, and as illustrated in FIG. 17, placement may be made such that they are aligned in a row in the vertical direction.

Moreover, although explanation has been given in the present exemplary embodiment of a case in which the light-blocking films 40A are placed on the $(12n+3)^{th}$ vertical direction lines and the light-blocking films 40B are placed on the $(12n+7)^{th}$ vertical direction lines (n=0, 1, 2, and so on), there is no limitation thereto.

For example, as illustrated in FIG. 18, configuration may be made such that the light-blocking films 40A are placed in the $(12n+3)^{th}$ vertical direction lines and the light-blocking films 40B are placed on the $(12n+6)^{th}$ vertical direction lines Moreover, configuration may be made as illustrated in FIG. 19 with the light-blocking films 40A placed in the $(12n+4)^{th}$ vertical direction lines and the light-blocking films 40B placed on the $(12n+7)^{th}$ vertical direction lines.

Moreover, configuration may be made as illustrated in FIG. 20 with the light-blocking films 40A placed in the $(12n+4)^{th}$ vertical direction lines (n=0, 1, 2, and so on) and the light-blocking films 40B placed on the $(12n+6)^{th}$ vertical direction lines.

Note that in the case illustrated in FIG. 20, since both the light-blocking films 40A and the light-blocking films 40B are placed in the vertical direction even numbered lines, video data is generated by reading the line image data of the vertical direction odd numbered lines.

Moreover, in the examples of FIG. 16 to FIG. 20, when considering units of the basic array pattern C, out of the 2 first array patterns A and 2 second array patterns B configuring the basic array pattern C, basic array patterns C provided with the light-blocking films 40A and the light-blocking films 40B in the upper side first array pattern A and second array pattern B are alternately disposed in a repeating configuration with basic array patterns C provided with the light-blocking films 40A and the light-blocking films 40B in the lower side first array pattern A and second array pattern B, however there is no limitation thereto.

For example, out of the 2 first array patterns A and 2 second array patterns B configuring the basic array patterns C, the light-blocking films 40A and the light-blocking films 40B may be provided only in the upper side first array pattern A and second array pattern B, the light-blocking films 40A and the light-blocking films 40B may be provided only in the lower side first array pattern A and second array pattern B, or the light-blocking films 40A and the light-blocking films 40B may be provided in both the upper side and lower side first array pattern A and second array pattern B.

Moreover, in the examples of FIG. 16 to FIG. 20, when considering units of the basic array pattern C, configuration is made with the light-blocking films 40A and the light-blocking films 40B placed in all the basic array patterns C, however there may be basic array patterns C present in the vertical direction not placed with the light-blocking films 40A and the light-blocking films 40B. Namely, a vertical direction thinned placement of the light-blocking films 40A and the light-blocking films 40B may be adopted on a basic array pattern C unit basis. A horizontal direction thinned placement of the light-blocking films 40A and the light-blocking films 40B may also be adopted on a basic array pattern C unit basis.

What is claimed is:

1. A color image pickup device comprising:
   an image pickup device comprising a plurality of photoelectric conversion elements arrayed in a horizontal direction and a vertical direction;
   a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern includes a first filter corresponding to a first color that contributes most to obtaining a brightness signal placed over 2×2 pixels at the top left and a pixel at the bottom right of a 3×3 square array, a second filter corresponding to a second color different from the first color placed over a pixel at a right end of a vertical direction center line of the square array and over a pixel at a left end of a vertical direction lower edge line of the square array, and a third filter corresponding to a third color different from the first color and the second color placed over a pixel at the right end of the vertical direction upper edge line of the square array and over a pixel at the center of the vertical direction lower edge line of the square array, and the second array pattern has the same placement of the first filter as that in the first array pattern and has a placement of the second filter and a placement of the third filter swapped over to those of the first array pattern; and
   phase difference detection pixels that are placed at positions corresponding to 2 pixels that are adjacent in the horizontal direction out of the 2×2 pixels of at least one side of the upper side or lower side disposed first array pattern and second array pattern out of the 2 first array patterns and the 2 second array patterns configuring the basic array pattern.

2. The color image pickup device of claim 1, further comprising:
   a light-blocking section provided to the respective phase difference detection pixels that comprises either a first light-blocking film that blocks light to a region that is a part of the pixel and lets light through to other regions, or a second light-blocking film that blocks light to part of the pixel and lets light pass through in a region that forms a pair with the light-pass region of the first light-blocking film.

3. The color image pickup device of claim 2, wherein the first light-blocking film in the light-blocking section blocks light to a pixel horizontal direction left half region, and the second light-blocking film blocks light to a pixel horizontal direction right half region.

4. The color image pickup device of claim 2, wherein a first phase difference detection pixel provided with the first light-blocking film and a second phase difference detection pixel provided with the second light-blocking film are placed adjacent to each other in the horizontal direction.

5. The color image pickup device of claim 1, wherein the first color is green (G), the second color is one color of red (R) or blue (B), and the third color is the other color of red (R) or blue (B).

6. An imaging apparatus comprising:
   the color image pickup device of claim 1;
   a drive section that drives the color image pickup device so as to read phase difference detection pixel data from the phase difference detection pixels; and
   a focus adjustment section that adjusts focus based on the phase difference detection pixel data.

7. A non-transitory storage medium storing a control program that causes processing to be executed in a computer to control an imaging apparatus equipped with a color image pickup device comprising:
   an image pickup device comprising a plurality of photoelectric conversion elements arrayed in a horizontal direction and a vertical direction;
   a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern includes a first filter corresponding to a first color that contributes most to obtaining a brightness signal placed over 2×2 pixels at the top left and a pixel at the bottom right of a 3×3 square array, a second filter corresponding to a second color different from the first color placed over a pixel at a right end of a vertical direction center line of the square array and over a pixel at a left end of a vertical direction lower edge line of the square array, and a third filter corresponding to a third color different from the first color and the second color placed over a pixel at the right end of the vertical direction upper edge line of the square array and over a pixel at the center of the vertical direction lower edge line of the square array, and the second array pattern has the same placement of the first filter as that in the first array pattern and has a placement of the second filter and a placement of the third filter swapped over to those of the first array pattern; and phase difference detection pixels that are placed at positions corresponding to 2 pixels that are adjacent in the horizontal direction out of the 2×2 pixels of at least one side of the upper side or lower side disposed first array pattern and second array pattern out of the 2 first array patterns and the 2 second array patterns configuring the basic array pattern; and wherein the processing of the control program of the imaging apparatus comprises driving the color image pickup device so as to read phase difference detection pixel data from the phase difference detection pixels, and adjusting focus based on the phase difference detection pixel data.

\* \* \* \* \*